United States Patent
Lee

(10) Patent No.: US 12,002,355 B2
(45) Date of Patent: Jun. 4, 2024

(54) METHOD FOR GUIDING PATH BY EXTRACTING GUIDING INFORMATION IN LANE AND ELECTRONIC DEVICE FOR EXECUTING THE METHOD

(71) Applicant: THINKWARE CORPORATION, Seongnam-si (KR)

(72) Inventor: Han Woo Lee, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 18/108,632

(22) Filed: Feb. 12, 2023

(65) Prior Publication Data

US 2023/0186763 A1 Jun. 15, 2023

Related U.S. Application Data

(63) Continuation of application No. 16/701,462, filed on Dec. 3, 2019, now Pat. No. 11,587,435.

(30) Foreign Application Priority Data

Dec. 7, 2018 (KR) .......................... 10-2018-0156698

(51) Int. Cl.
*G08G 1/04* (2006.01)
*G06F 18/211* (2023.01)
(Continued)

(52) U.S. Cl.
CPC ............. *G08G 1/04* (2013.01); *G06F 18/211* (2023.01); *G06V 20/588* (2022.01); *G08G 1/0145* (2013.01)

(58) Field of Classification Search
CPC .. G08G 1/04; G08G 1/0145; G08G 1/096822; G08G 1/096861; G08G 1/166;
(Continued)

(56) References Cited

U.S. PATENT DOCUMENTS 7,991,233 B2 * 8/2011 Besley ................. G06V 10/757
382/199
9,175,976 B2 11/2015 Kondo et al.
(Continued)

FOREIGN PATENT DOCUMENTS

| JP | 2008-293380 A | 12/2008 |
| KR | 2018-0005274 A | 1/2018 |
| KR | 2018-0092765 A | 8/2018 |

OTHER PUBLICATIONS

Office Action dated May 23, 2023, issued in counterpart KR Application No. 10-2018-0156698, with English Translation. (14 pages).

*Primary Examiner* — Kathleen Y Dulaney
(74) *Attorney, Agent, or Firm* — WHDA, LLP

(57) ABSTRACT

The present disclosure relates to a method for guiding a path of an electronic device and an electronic device. The method for guiding a path according to the present disclosure includes: acquiring a top-view image; extracting guiding information in a lane from lane information extracted from the top-view image; and guiding a path of a vehicle using the extracted lane information and the guiding information in the lane. According to the present disclosure, it is possible to promote safe driving by guiding a possible traveling direction on the path to a driver in real time through image analysis of a traveling road. In addition, it is possible to provide more detailed path guidance by providing the path guidance reflecting the necessity of lane change by recognizing the lane of the driving path.

20 Claims, 15 Drawing Sheets

(51) Int. Cl.
*G06V 20/56* (2022.01)
*G08G 1/01* (2006.01)

(58) Field of Classification Search
CPC .. G08G 1/0969; G06F 18/211; G06V 20/588; G01C 21/3626; G01C 21/3658; B60W 30/10
USPC .............. 382/104, 206; 701/423; 340/995.19
See application file for complete search history.

(56) References Cited

U.S. PATENT DOCUMENTS

| | | | |
|---|---|---|---|
| 10,739,156 B2 * | 8/2020 | Ko | G06V 20/588 |
| 2005/0117364 A1 | 6/2005 | Rennick et al. | |
| 2005/0143911 A1 | 6/2005 | Ishibashi et al. | |
| 2008/0002891 A1 * | 1/2008 | Shibata | G08G 1/096716 |
| | | | 382/209 |
| 2010/0121569 A1 * | 5/2010 | Nakamura | G01C 21/3658 |
| | | | 340/995.14 |
| 2010/0328316 A1 | 12/2010 | Stroila et al. | |
| 2012/0148094 A1 * | 6/2012 | Huang | G08G 1/054 |
| | | | 382/103 |
| 2014/0297181 A1 | 10/2014 | Kondo et al. | |
| 2014/0343842 A1 * | 11/2014 | Ranganathan | G01C 21/30 |
| | | | 701/472 |
| 2015/0186734 A1 | 7/2015 | Nakagawa | |
| 2016/0054138 A1 | 2/2016 | Kojo | |
| 2016/0252363 A1 | 9/2016 | Tertoolen et al. | |
| 2018/0286095 A1 | 10/2018 | Kusayanagi et al. | |
| 2019/0095722 A1 * | 3/2019 | Kang | G08G 1/167 |
| 2019/0303688 A1 * | 10/2019 | Yang | G06T 7/536 |
| 2020/0080863 A1 | 3/2020 | Ichinokawa | |
| 2020/0080864 A1 | 3/2020 | Ichinokawa | |
| 2020/0103907 A1 * | 4/2020 | Kaji | G08G 1/165 |
| 2020/0333144 A1 * | 10/2020 | Pögel | G01C 21/3602 |

* cited by examiner

METHOD FOR GUIDING PATH BY EXTRACTING GUIDING INFORMATION IN LANE AND ELECTRONIC DEVICE FOR EXECUTING THE METHOD

CROSS-REFERENCE TO RELATED APPLICATION(S)

This application is a continuation of U.S. application Ser. No. 16/701,462 filed Dec. 3, 2019, which claims benefit of priority to Korean Patent Application No. 10-2018-0156698 filed on Dec. 7, 2018 in the Korean Intellectual Property Office, the disclosure of which is incorporated herein by reference in its entirety.

BACKGROUND OF THE INVENTION

Field of the Invention

The present disclosure relates to a method for guiding a path of an electronic device and an electronic device.

Description of the Related Art

With the opening of the Internet network and the revisions of laws related to location data, location based service (LBS) related industries are being activated. Representative devices using such a location based service may include car navigation that provides a path guide service for positioning a current location of a vehicle or the like or guiding a moving path to a destination.

However, in reality, it is difficult for the current path guide service to organically guide a path according to a lane in which a vehicle is traveling and traveling possible direction information of the traveling lane in a road in which a plurality of lanes exist.

That is, there is a problem in that a lane change guidance is performed according to a path regardless of left, right, straight and u-turn directions of the traveling lane and whether a vehicle exists, and a driver should entirely determine a direction of an actual traveling road to determine the necessity of the lane change.

SUMMARY OF THE INVENTION

The present disclosure provides an electronic device and a method for guiding a path of the electronic device capable of supporting driver's safe driving under the assumption of accurate lane recognition.

According to the present disclosure, a method for guiding a path includes: acquiring an image; converting the acquired image into a top-view image; extracting a lane from lane display line in the converted top-view image; extracting guiding information in the extracted lane; and guiding a path of a vehicle using the extracted lane information and guiding information in the lane.

The guiding information in the lane may be information for guiding a possible traveling direction of the vehicle in the lane, and in the extracting of the guiding information, the information for guiding the possible traveling direction may be determined as a shape of an arrow and a feature of an arrow head portion may be extracted from the shape of the arrow to recognize the possible traveling direction of the lane.

In the extracting of the guiding information, the extracted feature of the head portion may be compared with a predetermined feature value of a mask to recognize the possible traveling direction, the mask may be divided into four triangular candidate areas and may be formed in a rectangle in which first and second squares are combined, two of the four triangular candidate areas may be located in first areas that are inner sides of the first square and the second square based on a line where the first square and the square are adjacent, and the other two of the four triangular candidate areas may be located in second areas that are outer sides of the first square and the second square to define feature values.

In the extracting of the guiding information, the possible traveling direction may be recognized through a mask corresponding to the comparison result of the feature values of the first areas and the second areas in the rectangular and the comparison result of the feature values of the first areas of the first square and the second areas of the second square.

The mask may be formed in rectangles continued in a horizontal direction based on the image and include a first mask that recognizes an upward possible traveling direction and a second mask that recognizes a downward possible traveling direction.

The mask may be formed in rectangles continued in a vertical direction based on the image and include a third mask that recognizes a leftward possible traveling direction and a fourth mask that recognizes a rightward possible traveling direction.

In the extracting of the guiding information, template matching or a support vector machine (SVM) may be further used to recognize the possible traveling direction of the lane.

In the extracting of the guiding information, it may be further determined whether a tail portion in the shape of the arrow includes additional information to recognize the possible traveling direction or a impossible traveling direction.

In the guiding, the path of the vehicle and the guiding information may be compared to guide whether a change to another lane is necessary.

In the guiding, it may be determined whether a vehicle exists in the lane so as to guide whether the change to the another lane is necessary.

According to the present disclosure, an electronic device for performing path guidance includes: an image acquisition unit configured to acquire an image; an image conversion unit configured to convert the acquired image into a top-view image; a lane extraction unit configured to extract a lane from a lane display line in the converted top-view image; a guiding information extraction unit configured to extract guiding information in the extracted lane; and a path guide unit configured to guide a path of a vehicle using the extracted lane information and guiding information in the lane.

The guiding information in the lane may be information for guiding a possible traveling direction of the vehicle in the lane, the information for guiding the possible traveling direction may be determined as a shape of an arrow, and the guiding information extraction unit may extract a feature of a head portion from the shape of the arrow to recognize the possible traveling direction of the lane.

The guiding information extraction unit may compare the extracted feature of the head portion with a predetermined feature value of a mask to recognize the possible traveling direction, the mask may be divided into four triangular candidate areas and may be formed as a rectangle in which first and second squares are combined, two of the four triangular candidate areas may be located in first areas that are inner sides of the first square and the second square based on a line where the first square and the square are adjacent, and the other two of the four triangular candidate areas may be located in second areas that are outer sides of the first square and the second square to define feature values.

The guiding information extraction unit may recognize the possible traveling direction through a mask corresponding to the comparison result of the feature values of the first areas and the second areas in the rectangle and the comparison result of the feature values of the first areas of the first square and the second areas of the second square.

The mask may be formed in rectangles continued in a horizontal direction based on the image and include a first mask that recognizes an upward possible traveling direction and a second mask that recognizes a downward possible traveling direction.

The mask may be formed in rectangles continued in a vertical direction based on the image and include a third mask that recognizes a leftward possible traveling direction and a fourth mask that recognizes a rightward possible traveling direction.

The guiding information extraction unit may further use template matching or a support vector machine (SVM) to recognize the possible traveling direction of the lane.

The guiding information extraction unit may further determine whether a tail portion in the shape of the arrow includes additional information to recognize the possible traveling direction or a impossible traveling direction.

The path guide unit may compare the path of the vehicle with the guiding information in the lane to guide whether a change to another lane is necessary.

The path guide unit may determine whether a vehicle exists in the lane to guide whether the change to the another lane is necessary.

Technical solutions of the present disclosure are not limited to the abovementioned solutions, and solutions that are not mentioned will be clearly understood by those skilled in the art to which the present disclosure pertains from the present specification and the accompanying drawings.

According to the present disclosure, it is possible to promote safe driving by guiding a possible traveling direction on a path to a driver in real time through image analysis of a traveling road. In addition, it is possible to provide more detailed path guidance by providing the path guidance reflecting the necessity of lane change by recognizing a vehicle path of the driving path.

In addition, it is possible for the driver to change the lanes in advance or at an accurate time by providing the notification of the lane change point in time using the vehicle path, the vehicle, and the road surface information recognized through the image.

BRIEF DESCRIPTION OF THE DRAWING FIGURES

DETAILED DESCRIPTION OF THE EXEMPLARY EMBODIMENTS

Figure 1:
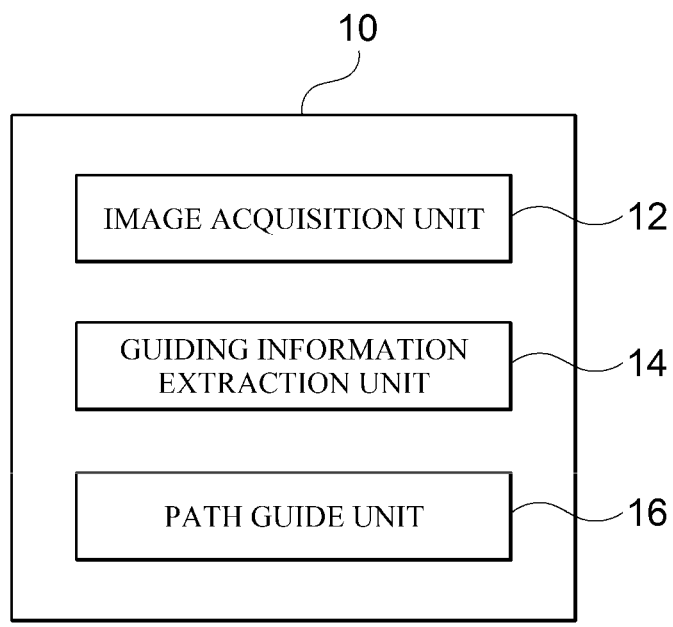
FIG. 1 is a block diagram illustrating an electronic device according to an embodiment of the present disclosure.

The following description illustrates only a principle of the present disclosure. Therefore, those skilled in the art may implement the principle of the present disclosure and invent various devices included in the spirit and scope of the present disclosure although not clearly described or shown in the present specification. In addition, it is to be understood that all conditional terms and embodiments mentioned in the present specification are obviously intended only to allow those skilled in the art to understand a concept of the present disclosure in principle, and the present disclosure is not limited to embodiments and states particularly mentioned as such.

The above-mentioned objects, features, and advantages will become more obvious from the following detailed description provided in relation to the accompanying drawings. Therefore, those skilled in the art to which the present disclosure pertains may easily practice a technical idea of the present disclosure.

Further, in describing the present disclosure, in the case in which it is judged that a detailed description of a well-known technology associated with the present disclosure may unnecessarily make the gist of the present disclosure unclear, it will be omitted. Hereinafter, exemplary embodiments of the present disclosure will be described in detail with reference to the accompanying drawings.

The foregoing objects, features, and advantages of the present disclosure will be more clear from the following detailed description. However, the present disclosure may be variously modified and have several embodiments. Therefore, specific embodiments of the present disclosure will be illustrated in the accompanying drawings and be described in detail. In principle, same reference numerals denote same constituent elements throughout the specification. In addition, when it is decided that a detailed description for the known function or configuration related to the present disclosure may obscure the gist of the present disclosure, the detailed description therefor will be omitted.

Hereinafter, configurations of an electronic device and a server according to an embodiment of the present disclosure will be described in more detail with reference to the accompanying drawings. In addition, terms "module" and "unit" for components used in the following description are used only to easily make the disclosure. Therefore, these terms do not have meanings or roles that distinguish from each other in themselves.

The electronic device described herein may include a mobile phone, a smart phone, a notebook computer, a digital broadcasting terminal, a personal digital assistant (PDA), a portable multi-media player (PMP), a navigation terminal, and the like. Hereinafter, for convenience of description, it is assumed that the electronic device is a navigation terminal.

Traffic related images are traffic images collected from a user device and other devices (for example, CCTV, and the like), and may be image data including still images and moving images that include road congestion information, road surface status information, accident information, notice information, and the like.

Hereinafter, the present disclosure will be described in detail with reference to the accompanying drawings.

An electronic device 10 according to an embodiment of the present disclosure will be described with reference to FIG. 1.

FIG. 1 is a block configuration diagram of an electronic device 10 according to an embodiment of the present disclosure.

In the present embodiment, the electronic device 10 may include an image acquisition unit 12, a guiding information extraction unit 14, and a path guide unit 16.

The image acquisition unit 12 acquires an image photographed while a vehicle is traveling.

The image acquisition unit 12 may convert and acquire a front image directly photographed by a camera module included in the electronic device 10. Alternatively, the image acquisition unit 12 may directly receive an image related to traveling of a vehicle from at least one external camera (not shown) or may convert and acquire the received image.

Specifically, in the present embodiment, the image acquisition unit 12 converts the image acquired by the camera into a top-view image. The top-view image conversion converts the image acquired by the camera into an image of an angle like looking at a ground road vertically from high above, and has the effect of removing perspective and concentrating necessary information in the region of interest. In this case, the electronic device 10 may configure an image conversion unit (not shown) as a separate module and convert the image acquired by the image acquisition unit 12 into the top-view image.

Therefore, in the present embodiment, the image acquisition unit 12 may convert and acquire any one of images acquired by photographing the front, the sides, and the rear into the top-view image. Alternatively, it is also possible to directly receive and acquire a top-view image photographed from an external photographing device having a visual field of a top view.

In this case, the electronic device 10 may use an inverse perspective transformation method to acquire the top-view image, and the image conversion may be performed through an internal image processing module.

The inverse perspective transformation method is a method that removes a perspective effect from an input image having the perspective effect using an inverse perspective transformation and converts location information of an image plane into location information of a world coordinate system. In the present embodiment, the inverse perspective transformation method may generate an image acquired by converting location information of a road plane into location information of a two-dimensional coordinate system at a top-view point in time using a lane display line included in the photographed front image.

The image conversion will be described in more detail with reference to FIGS. 3 and 4 on the basis of the front image.

In general, the front image photographed by the camera module of the traveling vehicle may be generated in a form in which objects existing actually in parallel are gathered toward a vanishing point of an image according to the perspective.

Figure 3:
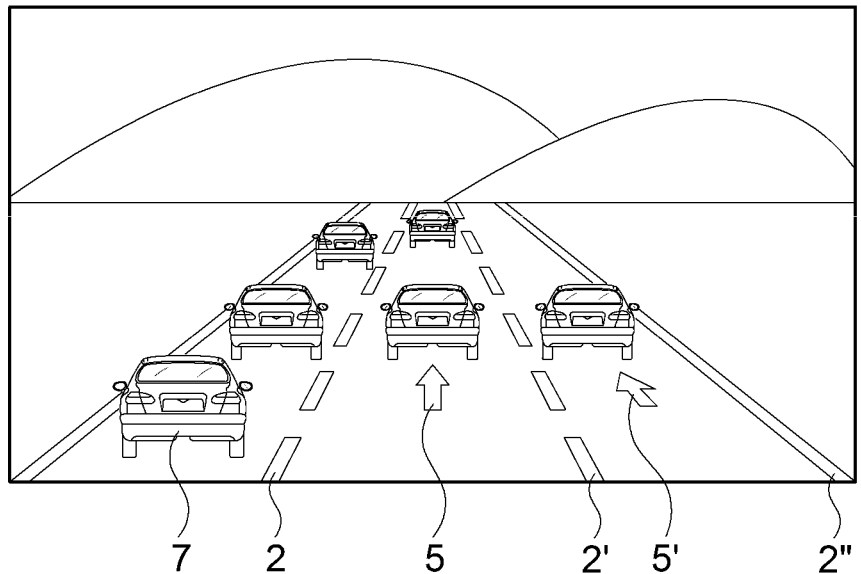
FIG. 3 is an exemplary diagram illustrating a front image according to an embodiment of the present disclosure.

In reality, all the actual lane display lines are marked on a road in parallel in a road where a plurality of lanes exist, but according to FIG. 3, in the photographed image, lanes may be gathered toward a vanishing point. In addition, even in a front vehicle 7 traveling in lane display lines 2, 2', and 2" or objects 5 and 5' displayed in the lanes, actual distances may also be displayed with being distorted in an image.

That is, unlike the actual shape, in the photographed image, an error may occur in determining the information of the object included in the front image as the shapes of the objects 5 and 5' are distorted or the sizes and the locations thereof are different.

Therefore, in order to recognize the information of the objects 5 and 5' included in the front image and to use the recognized information for traveling guide of the vehicle, it is necessary to consider the difference in the shape distortion of the photographed image and the distortion in the shape of the actual object to extract more accurate information.

In the present embodiment, the image processing module corrects the distortion according to the perspective of the front image and generates the top-view image close to the actual parallel state to extract information.

In detail, the image processing module may convert the front image into a two-dimensional top view image based on the lane display lines whose actual locations are expected to be parallel among the objects included in the front image.

The image processing module may generate a conversion equation between the lane display line included in the front image and the lane display line in the top-view image on the assumption that the plurality of lane display lines included in the front image are converted into lane display lines divided vertically and in parallel in the top-view image.

Figure 4:
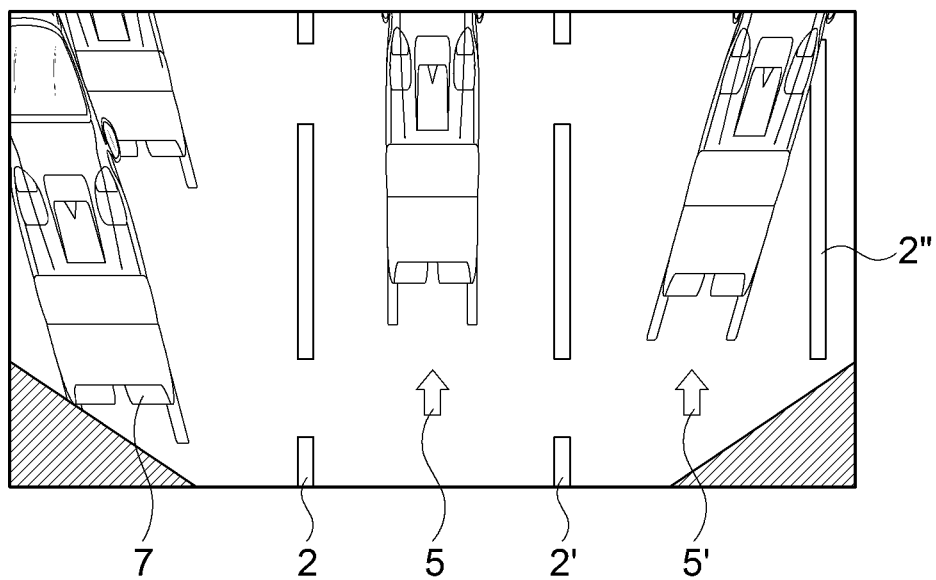
FIG. 4 is an exemplary diagram illustrating a top-view image acquired according to an embodiment of the present disclosure.

Referring to FIG. 4, the diagonal lane display lines 2, 2', and 2" of FIG. 3 may be changed to the parallel lane display lines 2, 2', and 2" of FIG. 4. Since the lane display lines marked on the actual road are marked in parallel as shown in FIG. 4, the top-view image may be more effective for recognizing the lane display lines.

In addition, driving direction display information, speed limit information, destination information, and other road marking information of a lane displayed in a lane may also be expressed in the top-view image along with the lane according to the actual marking type.

In particular, direction display information indicating whether the lane is a straight lane, a left-turn lane, a right-turn lane, or a U-turn lane points out a lane direction, and therefore it is important to prevent the shape of the direction display information from being distorted. As a result, the top-view image can be changed to correspond to the original shape without the distortion.

In addition, the top-view image transformation equation of the front image may be configured as a matrix, and initial values of the matrix may be determined according to the location of the camera photographing a first front image.

In addition, since a lane that is a basis of generation after the transformation matrix are generated has an interval determined according to a general road standard, the generated transformation matrix can be used to convert the front image continuously photographed when the location of the camera is not changed.

Therefore, the image processing module converts the front image into the top-view image by using the generated transformation matrix when the location of the camera is not changed or a lane width is not suddenly changed.

In addition, in the present embodiment, the image processing module may convert the photographed front image into the top-view image by generating color conversion and a region of interest (ROI).

In addition, in the present embodiment, the image processing module may convert the acquired image into the top-view image through warping, which is a type of geometric transformation based on the vanishing point detected in the acquired image.

In the present embodiment, since the lane display line is used to generate the transformation matrix, the lane display line in the image may be extracted through the color conversion and the ROI setting of the front image, and the transformation matrix may be more efficiently generated.

In addition, in the present embodiment, the image used by the image acquisition unit 12 is an image of a road, and therefore, an off-road background portion included in the front image is excluded by the image processing module, and the image without the background is converted into the top-view image, so the image may be used more effectively.

In addition, in the present embodiment, the image acquisition unit 12 may acquire the top-view image generated by the image processing module or may receive the image photographed at the top view point in time in advance.

The guiding information extraction unit 14 extracts the guiding information in the lane based on the lane display line in the image extracted from the top-view image.

As described above, the top-view image is generated by being converted based on the lane display line, and the objects included in the lane may be projected to the top-view image together with the lane.

Each of the guiding information included in the lane of the existing front image is included in the corresponding lane even in the converted top-view image and can be used as guiding information related to the lane as it is.

In this case, the electronic device 10 configures a lane extraction unit (not shown) as a separate module, and the guiding information extraction unit 14 uses the lane extracted from the lane extraction unit (not shown) to be able to extract the guiding information in the lane.

In the present embodiment, the guiding information in the lane may be direction display information for guiding a possible traveling direction of a vehicle in a lane as information for guiding a possible traveling direction of a vehicle in a lane.

In general, the possible traveling direction display information of the lane has a shape of an arrow, and a driver may recognize the possible traveling direction of a traveling lane or side lanes based on which direction the arrow points based on the possible traveling direction.

Figure 5A:
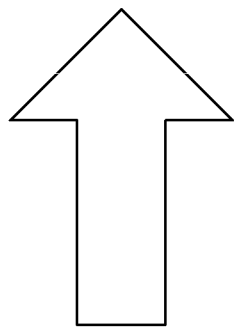
FIGS. 5A to 5D are exemplary diagrams illustrating guiding information according to an embodiment of the present disclosure.
Figure 5B:
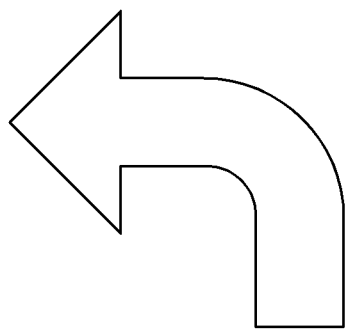

For example, an arrow pointing upward based on the top-view image as shown in FIG. 5A may be recognized as a straight display, and an arrow pointing leftward as shown in FIG. 5B may be recognized as a left-turn display.

Figure 5C:
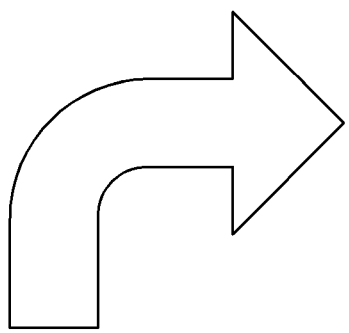
Figure 5D:
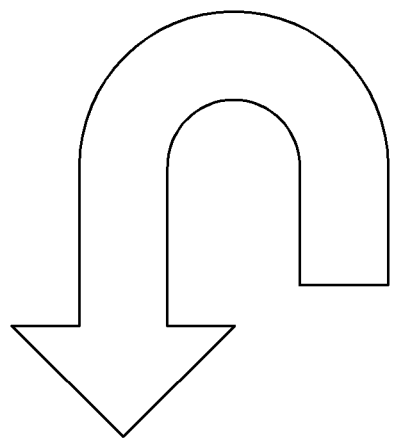

An arrow pointing rightward as shown in FIG. 5C may be recognized as a right-turn display, and an arrow pointing downward as shown in FIG. 5D may be recognized as a U-turn display.

That is, the direction display information may be configured as a general arrow shape of a head portion having a triangular shape and a tail portion having a rectangle or a curved rectangle shape.

In this case, since the shape of the triangle of the head portion of the direction display information is configured by varying an angle according to the meaning direction, in the present embodiment, the guiding information extraction unit 14 uses the head portion of the direction display information to extract the meaning of the object in the image.

The guiding information extraction unit 14 may generate a mask having a size corresponding to the arrow head portion and extract an object in the top-view image having a feature value corresponding to a feature value of the mask, thereby recognizing the traveling direction information.

Referring to FIGS. 6A to 6D, in the present embodiment, the mask may be divided into four triangular candidate areas, and may be configured as a rectangle in which first and second squares are combined.

In more detail, two of the four triangular candidate areas are located in first areas A1 and A2 that are inner sides of the first square and the second square based on a line where the first square and the square are adjacent, the other two of the four triangular candidate areas are located in second areas A0 and A3 that are outer sides of the first square and the second square, thereby making it possible to define feature values.

The guiding information extraction unit 14 recognizes the possible traveling direction through a mask corresponding to the comparison result of the feature values of the first area and the second area in the rectangle and the comparison result of the feature values of the first area of the first square and the second area of the second square.

Therefore, the first areas A1 and A2 of the two areas in the mask correspond to an actual arrow head portion and may have brighter values than the other second areas A0 and A3.

The second areas A0 and A3 correspond to the background other than the arrow head portion in the top-view image. In the actual image, the second areas A0 and A3 may have a color of an asphalt of a road or a color of a paved road and may have a darker value than the first areas A1 and A2.

In addition, the mask may be distinguished according to a direction in which the squares are continued. For example, a mask formed in squares continued in a horizontal direction based on the top-view image as shown in FIG. 6A or 6D may be used to distinguish upward and downward guide displays, and as shown in FIG. 6B or 6C, a mask formed in squares continued in a vertical direction may be used to distinguish leftward and rightward direction guide displays.

Figure 6A:
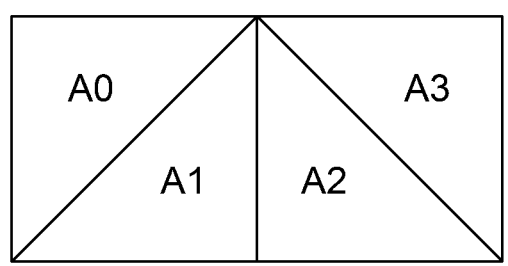
FIGS. 6A to 6D are exemplary diagrams illustrating a mask according to an embodiment of the present disclosure.
Figure 6B:
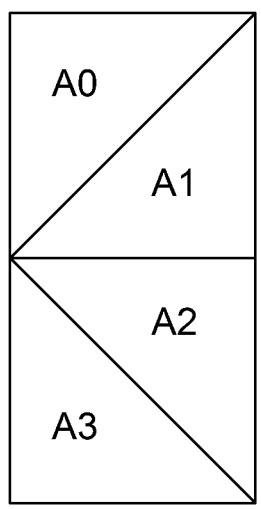
Figure 6C:
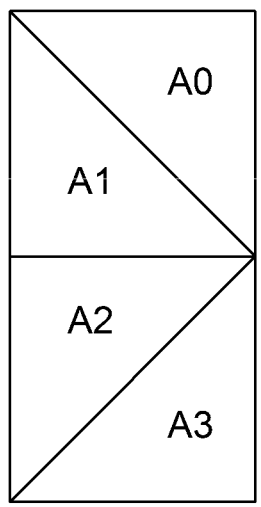
Figure 6D:
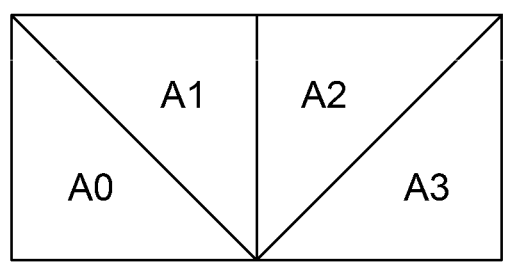

That is, the squared masks that are continued in the horizontal direction may be divided into a first mask that is recognized by the upward guide display of FIG. 6A and a second mask that is recognized by the downward direction guide display of FIG. 6D.

In addition, the squared masks that are continued in the vertical direction may be divided into a third mask that is recognized by the leftward guide display of FIG. 6B and a fourth mask that is recognized by the rightward direction guide display of FIG. 6C.

In the present embodiment, the guiding information extraction unit 14 may search for the mask area in the top-view image and compare a distribution of feature values of areas including candidate objects to be searched, thereby making it possible to recognize a possible traveling direction.

Describing in more detail referring to FIGS. 6A to 6D, the mask is divided into the four areas A0, A1, A2, and A3 in present embodiment, and the relationship between the feature values of each area may be defined as in Equation 1 below.

A1>A0 & A2>A3 & A1>A3 & A2>A0    [Equation 1]

In this case, the feature values of each area may be a brightness value of each area and may correspond to each mask when the above four conditions are satisfied.

In more detail, an object that satisfies the above equation among areas divided into squares horizontally continued may be matched to any of the masks of FIGS. 6A and 6D.

In addition, an object that satisfies the above equation among areas divided into squares vertically continued may be matched to any of the masks of FIGS. 6B and 6C.

Therefore, in order to distinguish a mask corresponding to an object among two masks, a histogram that defines a distribution of feature values according to locations of pixels in an image may be further used.

That is, when two direction display information of the four direction display information is determined as the condition according to the above equation through a mask consisting of two continuous squares, the corresponding direction display information may be accurately recognized through an additional histogram.

The histogram can be expressed as the distribution of the feature values, and the distribution of the feature values can be extracted by searching for pixels in the top-view image based on a horizontal x-axis or a vertical y-axis.

In this case, a search criterion of a pixel for determining the distribution of the feature values may be determined according to the continuous direction of the mask. For example, when the squared areas constituting the mask are horizontally continued, the pixels in the image may be searched in the y-axis direction. That is, in the case of the arrow head of the straight display as shown in FIG. 5A, the distribution in which the number of pixels having the feature value or more decreases as the y-axis value increases with respect to the y-axis within the mask area may appear.

Figure 7A:
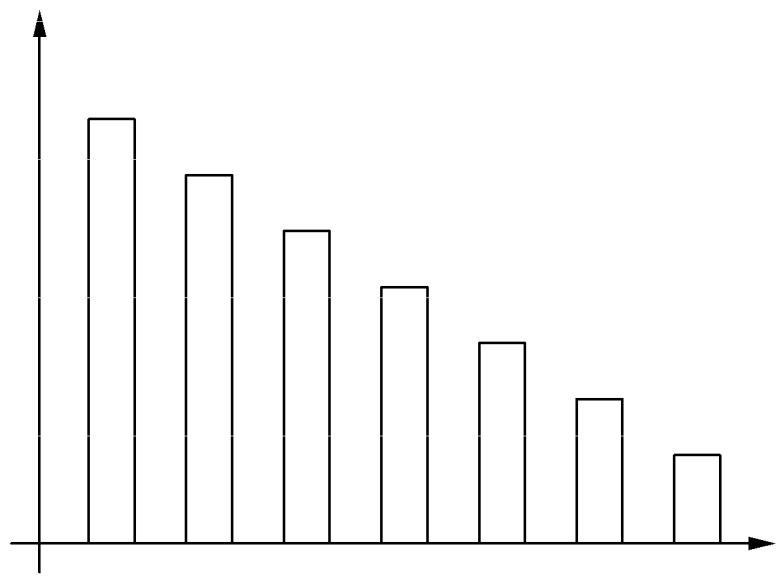
FIGS. 7A and 7B are exemplary diagrams illustrating a histogram according to an embodiment of the present disclosure.

Therefore, when the feature values of the object are distributed in the histogram of the form as shown in FIG. 7A, the guiding information extraction unit 14 may recognize the direction information display indicating straightness.

Figure 7B:
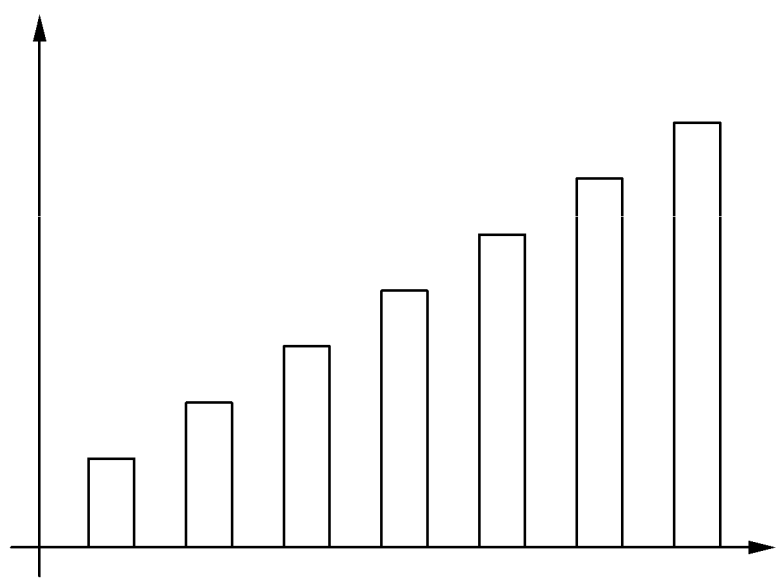

In contrast, in the case of the arrow head of the U-turn display, the distribution in which the number of pixels having the feature value or more increases as the y-axis value increases with respect to the y-axis of the pixel may appear as shown in FIG. 7B. By doing so, the guiding information extraction unit 14 may recognize the direction information display indicating the U-turn.

In addition, when the squared areas constituting the mask are horizontally continued, the pixels in the image may be searched in the x-axis direction. That is, in case of an object that means a left turn or a right turn, the object may be recognized by searching for pixels in the top-view image based on the x axis and extracting the distribution of the feature values.

In the case of the arrow head of the left turn display, the distribution in which the number of pixels having a feature value or more increases as the x-axis value increases with respect to the x-axis may appear. Therefore, the arrow head is represented by the histogram of the aspect as shown in FIG. 7B and may be recognized as the direction information display meaning the left turn.

On the contrary, in the case of the arrow head which means the right turn, the distribution in which the number of pixels having the feature value or more decreases as the x-axis value increases with respect to the x axis may appear. In this case, the arrow head is represented by the histogram as shown in FIG. 7A and can be recognized as the direction information display meaning the right turn.

That is, in the case of two masks having the same direction in which the squares constituting the mask are continued, the direction display information may be distinguished through the change in the distribution of the feature values in the mask.

In addition, in the present embodiment, when guiding information extraction unit 14 recognizes the direction of the arrow by the above Equation 1, the guiding information extraction unit 14 may more accurately extract guiding information by additionally using template matching or a support vector machine (SVM).

For example, diagrams corresponding to the shapes of each arrow may be stored in advance as the template, and guiding information in which the diagrams and the shapes are matched may be extracted in the image, thereby making it possible to accurately extract the possible traveling direction information.

Alternatively, a decision boundary for classifying the possible traveling direction information and a road surface may be extracted using the SVM, and the shape of the arrow can be recognized through a shape formed by the decision boundary.

In addition, the guiding information extraction unit 14 according to the present embodiment may generate the mask having the size corresponding to the arrow head portion and extract the object in the top-view image having the feature value corresponding to the feature value of the mask to recognize the traveling direction information and determine whether an object including an additionally recognized arrow includes additional information.

For example, when the direction is recognized through an arrow head portion of the object but an image of a shape in which left-right symmetric bars representing 'X' on an arrow tail portion cross is further detected, it is also possible to determine the exact meaning that the recognized direction is the impossible traveling direction, not the possible traveling direction.

In addition, when the number of directions recognized through the arrow head portion of the object is plural, the number of possible traveling directions can also be plural.

That is, when there are a plurality of arrow head portions in the display information detected in the same lane and thus the determined number of possible traveling directions is plural, it may be determined that all the directions are the possible traveling directions.

As described above, the guiding information extraction unit 14 may extract the guiding information indicated by the object in the top-view image through the above-described process.

In addition, the guiding information extraction unit 14 may extract various objects that can be displayed on the road surface, such as a front vehicle, destination information, and speed limit information, in addition to the direction display information as the object information in the lane, and may provide the extracted guiding information to be used for the path guidance.

As described above, in the embodiment of the present disclosure, when recognizing the guiding information in the lane, the feature is extracted using a geometric mask, and after the feature of the guiding information is extracted, the guiding information may be recognized by measuring the histogram similarity of the candidate area.

In this embodiment, the path guide unit 16 may guide the path of the vehicle by using the extracted lane information and the guiding information in the lane.

For example, when a user is guided a path as he/she enters a destination in advance but a traveling lane is a lane having a direction different from a path, a lane change may be guided.

That is, even if a left turn is required, when a vehicle continues to travel in a straight lane, the path guide unit 16 may guide the necessity of the lane change of the vehicle through the extracted guiding information, and specifically guide to which lane and how many times to change.

Furthermore, it is also possible to further confirm and guide the existence of the vehicle ahead of the lane to be changed before guiding the lane change.

When the top-view image according to the present embodiment is generated by converting the front image, as shown in FIG. 4, the actual shape of the vehicle 7 included in FIG. 3 may be displayed in a distorted shape.

Referring to FIG. 4, even if it is difficult to determine a specific type of vehicles or a locations of a vehicle through the displayed vehicle 7 in the top-view image, the existence of the vehicle in the lane can be more easily determined, so the guiding information extraction unit 14 may determine the existence of the vehicle using the top-view image.

That is, in the present embodiment, even if the lane change is necessary, the path guide unit 16 may perform control not to output the lane change guidance by determining a priority condition.

Specifically, the priority condition may be preferentially considered when a vehicle exists in a lane to be changed, when a re-search of a path occurs, or when an event occurs in a traveling lane after a branch.

For example, when the guiding information extraction unit 14 determines the existence of the vehicle, the path guide unit 16 may stop or delay the guide even if the lane change is necessary.

Thereafter, the path guide unit 16 may provide the lane change along with the path guidance when it is confirmed in the top-view image that the vehicle does not exist or the space for the lane change is secured during the traveling.

In the present embodiment, the path guide unit 16 may use a display module to visually provide the path guiding information to the driver.

That is, the path guide unit 16 may display the path guiding information according to a predetermined user interface through the display module.

For example, when the electronic device 10 is a navigation device, since a display device for guiding a path is included, the electronic device 10 can clearly display whether the lane change is necessary based on the current traveling lane.

However, according to the present disclosure, since the electronic device 10 needs to provide the guiding information to the user more realistically as information for the driving assistance of the user in addition to the simple path guidance, the electronic device 10 may be provided the guiding information using an external display device.

In more detail, the external display device may be a head up display (HUD) or an augmented reality (AR) device.

In the case of the HUD device, an image is reflected on a windshield of the vehicle, and a vehicle driver may obtain information by checking the image reflected on the windshield. In this case, a display unit may provide a driver with traveling guiding information on the image displayed by the HUD.

Therefore, the user may check an image displayed while watching the front without moving a gaze while driving, and may receive a guide message when the lane change is needed.

Alternatively, the augmented reality device may be used to provide more detailed information.

The augmented reality device may provide a virtual image by superimposing a virtual image on the front image acquired through the camera.

In general, the traveling guide using the augmented reality may add a display element corresponding to a traveling state of a vehicle to a ground area of a traveling image to express traveling states such as notifications, cautions, and warnings.

As the display element for expressing the traveling state, at least one of color and pattern may be applied. The ground area may be expressed as visual elements suitable for each traveling state so that the traveling states (e.g., general traveling state, overspeed traveling state, caution section entry state, GPS shadow section entry state) are separately defined in advance and match characteristics of colors.

In more detail, the display unit may display whether to change a lane as an image object. Accordingly, the user may intuitively receive the traveling guiding information related to the lane through an object displayed superimposed on the traveling lane.

Hereinafter, a method for guiding a path through extraction of guiding information in a lane of the electronic device 10 according to an embodiment of the present disclosure will be described with reference to FIGS. 2A to 2C.

Figure 2A:
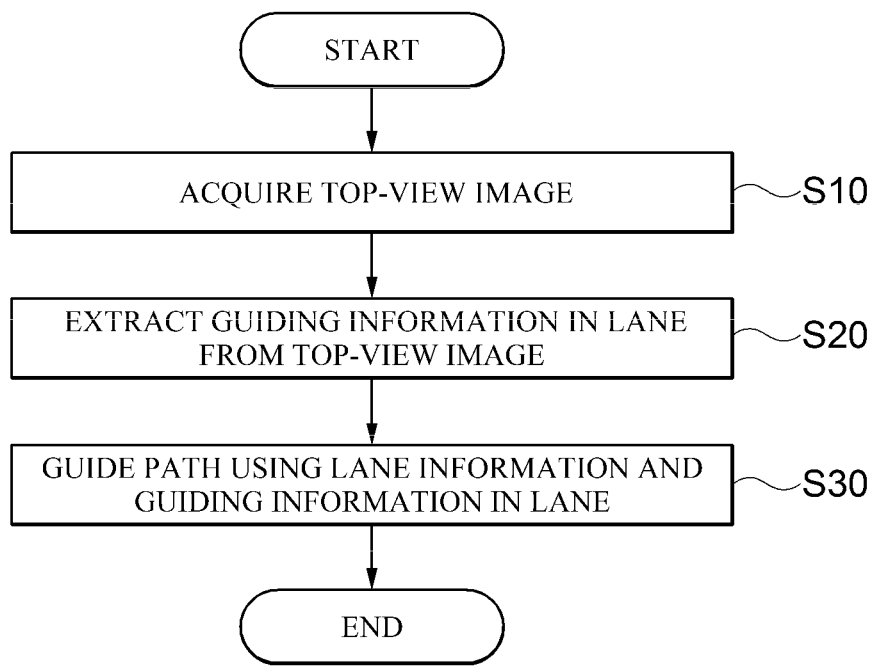
FIGS. 2A to 2C are flowcharts illustrating a method for guiding a path according to an embodiment of the present disclosure.

FIG. 2A is a flowchart illustrating a method for guiding a path according to an embodiment of the present disclosure.

Referring to FIG. 2A, the image acquisition unit 12 of the electronic device 10 acquires an image photographed while traveling of the vehicle (S10).

In detail, in the acquiring (S10), the top-view image converted by the image processing module can be acquired, or the top-view image photographed by an external device can be received.

Figure 2B:
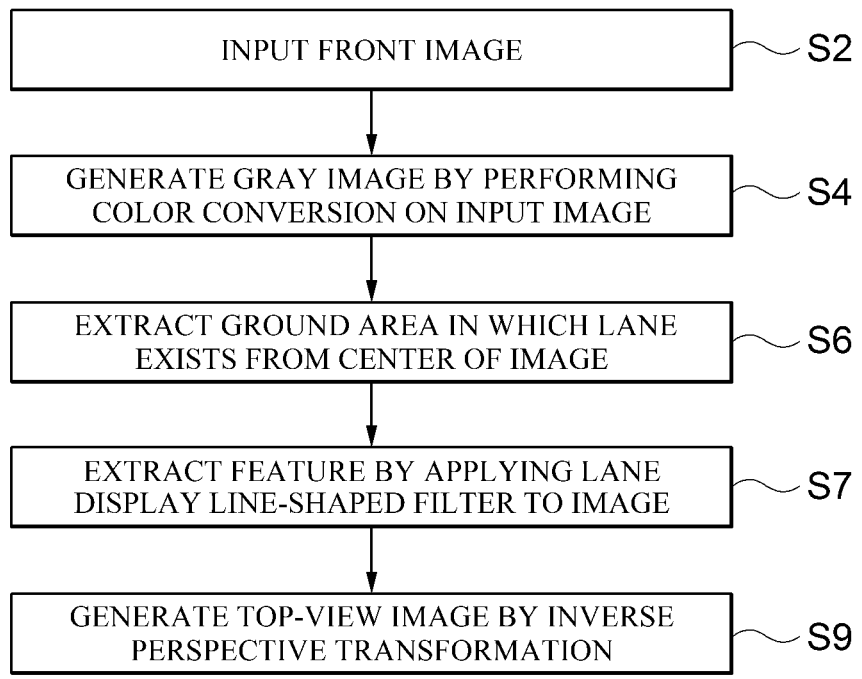

Referring to FIG. 2B, the image processing module may receive the front image (S2) and generate a gray image by performing a color conversion on the input image (S4).

The image processing module may recognize a horizon in the image using the center or the vanishing point of the generated gray image, and may extract the image of the ground area by assuming the following region as the ground area based on the horizon (S6).

The image processing module sets the ground area as the region of interest (ROI), and in the present embodiment, a lane display line-shaped filter may be applied to an image to extract a lane display line that is a conversion criteria into a top-view image to extract features (S7), and the lane may be used to convert the front image into the top-view image using a lane display line (S9).

When the top-view image is acquired, the guiding information extraction unit 14 extracts the guiding information in the lane based on the lane information extracted from the top-view image (S20).

In the present embodiment, in the extracting (S20), the traveling lane of the driver's vehicle may be recognized from the top-view image acquired through the image processing module, and the guiding information related to the lane may be extracted based on the traveling lane.

Figure 2C:
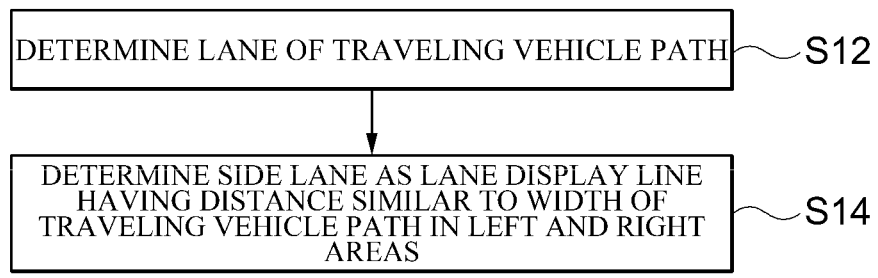

Referring to FIG. 2C, in the extracting (S20), the lane of the traveling lane may be determined from the detected lane of display lines of the top-view image acquired before the extraction of the guiding information (S12).

For example, when a plurality of lane display lines are detected from an image, the lane detection unit sets a reference line that vertically crosses the image, and selects a lane display line corresponding to the lane in which the vehicle is traveling based on the distance between the reference line and each lane display line.

That is, the lane display line close to the reference line may be selected as the lane display line associated with the lane in which the vehicle is traveling. In addition, the lane detection unit may distinguish a left display line and a right display line of a lane in which a vehicle is traveling depending on which direction the vehicle is located based on the reference line.

In the extracting (S20), when the traveling lane of the vehicle is determined, the width of the traveling lane may be calculated, and lane display lines having a distance similar to the calculated width may be determined as lane display lines of the side lanes (S14).

When the lanes are determined, in the extracting (S20), the top-view image is searched as an area defined as a plurality of continuous squares and an object such as a mask whose feature value is defined in advance.

Specifically, in the present embodiment, in the extracting (S20), the direction display guide marked in the lane is extracted, and a triangle-shaped object corresponding to the arrow head portion included in the direction display guiding information is extracted through the mask.

Thereafter, the meaning of the guide display information may be extracted through the corresponding mask.

In addition, the guiding information extraction unit 14 may extract the existence or non-existence of the front vehicle and other road markings as the information related to the path in addition to the object related to the direct guide of the path to use the guiding information.

Next, the path guide unit 16 guides the path of the vehicle by using the extracted lane information and the guiding information in the lane (S30).

In the present embodiment, in the guiding S30, the path of the vehicle and the guiding information in the lane may be compared to guide whether to change to other lanes.

For example, when a driver needs to change to a left turn lane on the path but the current traveling lane is a straight lane, a driver is guided to which lane the lane changes by referring to the guiding information extracted from the top-view image.

In addition, in the guiding S30, the existence or non-existence of the vehicle in other lanes can be determined and used for guide. That is, when it is determined that other vehicles exist by determining whether the vehicle exists in the lane, a collision situation of a vehicle may occur when a path is generated according to the guide, and thus the guide may be delayed and the guide may be resumed when there is no vehicle.

As described above, according to the present disclosure, it is possible to promote safe driving by guiding a possible traveling direction on a path to a driver in real time through image analysis of a traveling road. In addition, it is possible to provide more detailed path guidance by providing the path guidance reflecting the necessity of lane change by recognizing the lane of the driving path.

In addition, it is possible for the driver to change the lanes in advance or at an accurate time by providing the notification of the lane change point in time using the vehicle path, the vehicle, and the road surface information recognized through the image.

Meanwhile, the electronic device 10 may be implemented as a module of an advanced driver assistance system (ADAS) or of a system 100 for autonomous driving to perform a path guide function. In addition, it is also possible to transmit/provide the image recognition and the analysis result to an intelligent transport systems (ITS) server through an in-vehicle communication device and perform a path guide function accordingly.

This will be described in more detail with reference to FIGS. 8 to 10.

Figure 8:
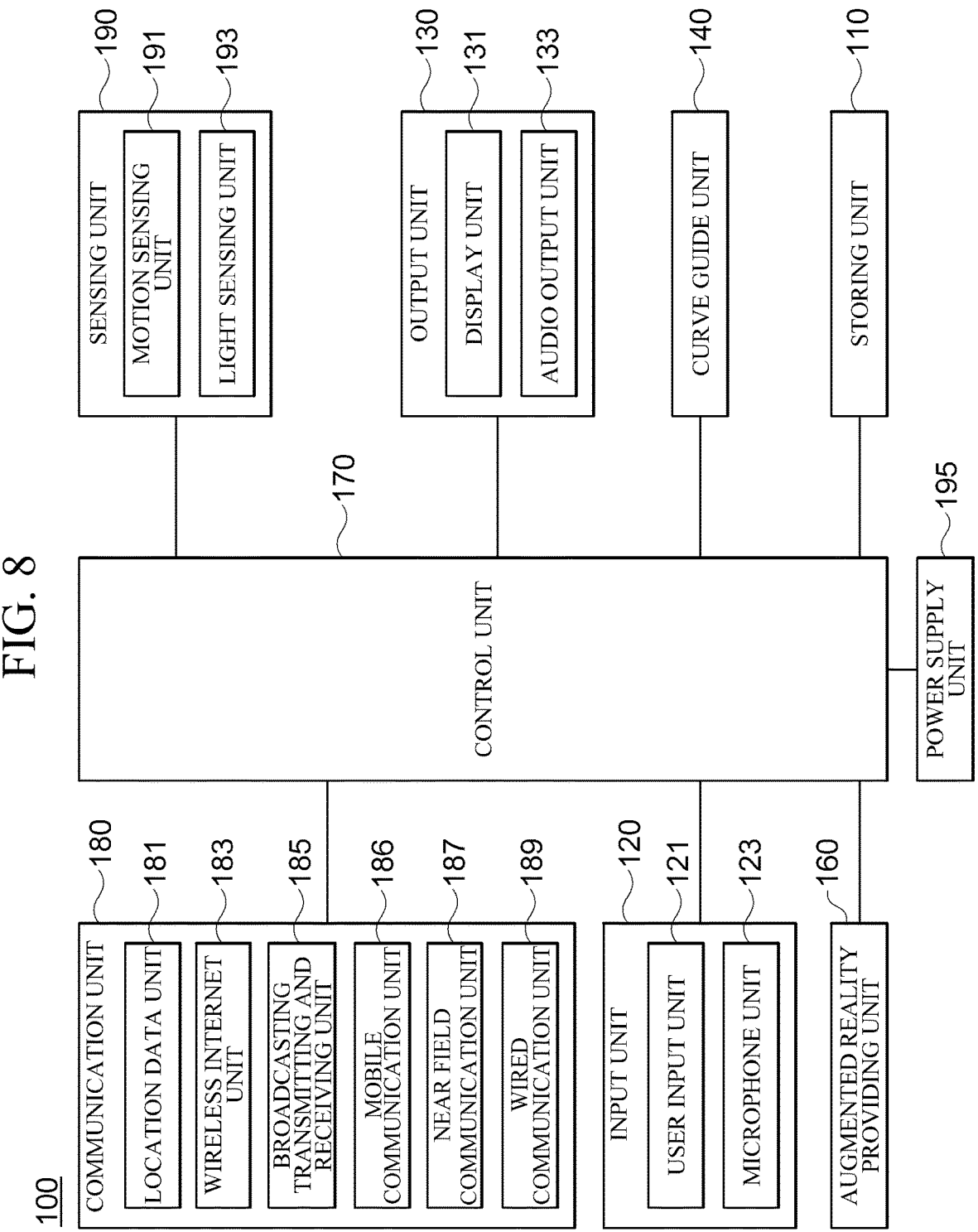
FIG. 8 is a block diagram illustrating a system according to an embodiment of the present disclosure.

FIG. 8 is a block diagram illustrating a system according to an embodiment of the present disclosure. Referring to FIG. 8, the system 100 is configured to include all or some of a storage unit 110, an input unit 120, an output unit 130, a curve guide unit 140, an augmented reality providing unit 160, a control unit 170, a communication unit 180, a sensing unit 190, and a power supply unit 195.

Here, the system 100 may be implemented by various devices such as a smart phone, a tablet computer, a laptop computer, a personal digital assistant (PDA), a portable multimedia player (PMP), smart glasses, project glasses, a navigation device, a car dash cam or a car video recorder as a video photographing for a vehicle which can provide a driving related guidance to a driver of a vehicle, and the like, which may be provided in the vehicle.

The driving-related guide may include a variety of guidance to assist driving of a vehicle driver, for example, path guidance, lane departure guidance, lane keeping guidance, front vehicle starting guidance, traffic light change guidance, front vehicle collision preventing guidance, lane change guidance, lane guidance, curve guidance, etc.

Here, the path guidance may include augmented reality path guidance performing path guidance by combining various information such as a location, a direction, and the like, of a user with an image obtained by photographing the front of the vehicle that is being operated and two-dimensional (2D) or three-dimensional (3D) path guidance performing path guidance by combining various information such as a location, a direction, and the like, of a user with a 2D or 3D map data.

In addition, the path guidance may include an air map path guidance that combines various information such as a location and a direction of a user with air map data to perform the path guidance. Here, the path guidance may be interpreted as a concept including path guidance in the case in which the user walks or runs and moves as well as in the case in which the user gets in the vehicle and then drives the vehicle.

In addition, the lane departure guidance may be to guide whether or not the vehicle that is being driven has departed from a lane.

In addition, the lane keeping guidance may be to guide the vehicle to return to the lane in which the vehicle is originally traveling.

In addition, the front vehicle starting guide may be to guide whether or not a vehicle located in front of the vehicle that is being stopped has started.

In addition, the traffic light change guidance may be to guide whether or not a traffic light located in front of a vehicle that is being stopped has been changed. As an example, in the case where a state in which a red traffic light indicating a stop signal is turned on is changed to a blue traffic light indicating a start signal, the traffic light change guidance may guide the case.

In addition, the front collision preventing guidance may be to guide that a distance between a vehicle that is being stopped or driven and a vehicle located in front of the vehicle is within a predetermined distance in order to prevent collision between the above-mentioned vehicles when the distance between the vehicle that is being stopped or driven and the vehicle located in front of the vehicle is within the predetermined distance.

In addition, the lane change guidance may be to guide a change from a lane in which a vehicle is located into another lane in order to guide a path up to a destination.

In addition, the lane guidance may be to guide a lane in which a vehicle is currently located.

In addition, the curve guidance may guide that a road on which a vehicle will travel is a curve after a predetermined time.

A driving related image such as a front image of the vehicle enabling provision of various kinds of guidance may be photographed by a camera of smart phone or a camera mounted in the vehicle. Here, the camera may be a camera formed integrally with the system 100 mounted in the vehicle and photographing the front of the vehicle.

As another example, the camera may be a camera mounted in the vehicle separately from the system 100 and photographing the front of the vehicle. In this case, the camera may be a separate vehicle imaging device mounted toward the front of the vehicle, and the system 100 may receive a photographed image through wired/wireless communication with the separately mounted vehicle imaging device or the system 100 may receive the photographed image when a storage medium storing the photographed image of the vehicle imaging device is inserted into the system 100.

Hereinafter, the system 100 according to an embodiment of the present disclosure will be described in more detail on the basis of the above-mentioned content.

The storage unit 110 serves to store various data and applications required for an operation of the system 100. In particular, the storage unit 110 may store data required for the operation of the system 100, for example, an operating system (OS), a path search application, a map data, and the like. In addition, the storage unit 110 may store data generated by the operation of the system 100, for example, searched path data, a received image, and the like. In addition, the storage unit 110 may store lane information and guiding information necessary for the traveling of the vehicle in advance, and may receive and store updated lane information and guiding information from the server through the communication unit 180.

Here, the storage unit 110 may be implemented by a detachable type of storing device such as a universal serial bus (USB) memory, or the like, as well as an embedded type of storing device such as a random access memory (RAM), a flash memory, a read only memory (ROM), an erasable programmable ROM (EPROM), an electronically erasable and programmable ROM (EEPROM), a register, a hard disk, a removable disk, a memory card, a universal subscriber identity module (USIM), or the like.

The input unit 120 serves to convert a physical input from the outside of the system 100 into a specific electrical signal. Here, the input unit 120 may include all or some of a user input unit 121 and a microphone unit 123.

The user input unit 121 may receive a user input such as a touch, a push operation, or the like. Here, the user input unit 121 may be implemented using at least one of various buttons, a touch sensor receiving a touch input, and a proximity sensor receiving an approaching motion.

The microphone unit 123 may receive a user voice and a sound generated inside and the outside of the vehicle.

The output unit 130 is a device that outputs the data of the system 100 to the user as a video and/or audio. Here, the output unit 130 may include all or some of a display unit 131 and an audio output unit 133.

The display unit 131 is a unit outputting data that may be visually recognized by a user. The display unit 131 may be implemented by a display unit provided on a front surface of a housing of the system 100. In addition, the display unit 131 may be formed integrally with the system 100 and output visual recognition data, or may be installed separately from the system 100 like a head-up display (HUD) and output visual recognition data.

The audio output unit 133 is a unit outputting data that may be auditorily recognized by the system 100. The audio output unit 133 may be implemented by a speaker representing a data that is to be reported to the user of the system 100 as a sound.

The curve guide unit 140 may perform the function of the above-described curve guide device. Specifically, the curve guide unit 140 acquires link information corresponding to a road on which a vehicle travels, determines a location at a link of the vehicle at a future time point, and uses the determined location and the vehicle speed at the reference time point, thereby determining the risk of the curve section in which the vehicle will travel after a predetermined time.

The augmented reality providing unit 160 may provide an augmented reality view mode. Here, the augmented reality is a method of visually superimposing and providing additional information (for example, a graphic element indicating a point of interest (POI), a graphic element guiding a curve, various additional information for assisting safe driving of a driver, and the like) with and on a screen including a real world actually viewed by the user.

The augmented reality providing unit 160 may include all or some of a calibration unit, a 3D space generation unit, an object generation unit, and a mapping unit.

The calibration unit may perform calibration for estimating camera parameters corresponding to the camera from the photographed image photographed in the camera. Here, the camera parameters, which are parameters configuring a camera matrix, which is information indicating a relationship between a real space and a photograph, may include camera extrinsic parameters and camera intrinsic parameters.

The 3D space generation unit may generate a virtual 3D space on the basis of the photographed image photographed in the camera. In detail, the 3D space generation unit may generate the virtual 3D space by applying the camera parameters estimated by the calibration unit to a 2D photographed image.

The object generation unit may generate objects for guidance, for example, a path guidance object, a lane change guidance object, a lane departure guidance object, a curve guidance object, and the like, on the augmented reality.

The mapping unit may map the object generated by the object generation unit to the virtual 3D space generated by the 3D space generation unit. In detail, the mapping unit may determine a location of the object generated in the object generation unit on the virtual 3D space, and perform mapping of the object to the determined location.

The communication unit 180 may be provided in order for the system 100 to communicate with other devices. The communication unit 180 may include all or some of a location data unit 181, a wireless Internet unit 183, a broadcasting transmitting and receiving unit 185, a mobile communication unit 186, a near field communication unit 187, and a wired communication unit 189.

The location data unit 181 is a device obtaining location data through a global navigation satellite system (GNSS). The GNSS means a navigation system that may calculate a location of a receiving terminal using a radio signal received from an artificial satellite. As a detailed example of the GNSS may include a global positioning system (GPS), a Galileo system, a global orbiting navigational satellite system (GLONASS), a COMPASS, an Indian regional navigational satellite system (IRNSS), a quasi-zenith satellite system (QZSS), and the like, depending on an operating subject of the GNSS. The location data unit 181 of the system 100 according to an embodiment of the present disclosure may obtain location data by receiving GNSS signals served in an area in which the system 100 is used. Alternatively, the location data unit 181 may obtain location data through communication with a base station or an access point (AP) in addition to the GNSS.

The wireless Internet unit 183 is a device accessing the wireless Internet to obtain or transmit data. The wireless Internet unit 183 may access the Internet network through various communication protocols which are defined to perform wireless data transmission and reception of wireless LAN (WLAN), wireless broadband (Wibro), world interoperability for microwave access (Wimax), and high speed downlink packet access (HSDPA).

The broadcasting transmitting and receiving unit 185 is a device transmitting and receiving broadcasting signals through various broadcasting systems. The broadcasting system that may transmit and receive the broadcasting signals through the broadcasting transmitting and receiving unit 185 may be a digital multimedia broadcasting terrestrial (DMBT), digital multimedia broadcasting satellite (DMBS), a media forward link only (MediaFLO), a digital video broadcast handheld (DVBH), an integrated services digital broadcast terrestrial (ISDBT), or the like. The broadcasting signals transmitted and received through the broadcasting transmitting and receiving unit 185 may include a traffic data, a living data, and the like.

The mobile communication unit 186 may perform voice and data communication by accessing mobile communication networks depending on various mobile communication protocols such as 3rd generation (3G), 3rd generation partnership project (3GPP), long term evolution (LTE), and the like.

The near field communication unit 187 is a device for short range communication. The near field communication unit 187 may perform communication through Bluetooth, radio frequency identification (RFID), infrared data association (IrDA), ultra wideband (UWB), ZigBee, near field communication (NFC), wireless-fidelity (Wi-Fi), or the like, as described above.

The wired communication unit 189 is an interface device that may connect the system 100 to other devices in a wired manner. The wired communication unit 189 may be a USB module that may perform communication through a USB port.

The communication unit 180 may communicate with another device using at least one of the location data unit 181, the wireless Internet unit 183, the broadcasting transmitting and receiving unit 185, the mobile communication unit 186, the short range communication unit 187, and the wired communication unit 189.

For example, when the system 100 does not include a camera function, the system 100 may receive an image photographed by a video photographing device for a vehicle such as a car dash cam or a car video recorder through at least one of the near field communication unit 187 or the wired communication unit 189.

As another example, in the case in which the system communicates with a plurality of devices, the system may communicate with any one of the plurality of devices through the near field communication unit 187, and communicate with another device of the plurality of devices through the wired communication unit 119.

The sensing unit 190 is a unit that may sense a current state of the system 100. The sensing unit 190 may include all or some of a motion sensing unit 191 and a light sensing unit 193.

The motion sensing unit 191 may sense motion of the system 100 on a 3D space. The motion sensing unit 191 may include a tri-axial terrestrial magnetism sensor and a tri-axial acceleration sensor. Motion data obtained through the motion sensing unit 191 may be combined with the location data obtained through the location data unit 181 to more accurately calculate a trajectory of a vehicle to which the system 100 is attached.

The light sensing unit 193 is a device measuring surrounding illuminance of the system 100. Brightness of the display unit 131 may be changed so as to correspond to surrounding brightness using illuminance data obtained through the light sensing unit 193.

The power supply unit 195 is a device supplying power required for an operation of the system 100 or an operation of another device connected to the system 100. The power supply unit 195 may be a device receiving power from a battery embedded in the system 100, or an external power supply such as a vehicle. Alternatively, the power supply unit 195 may be implemented by the wired communicating unit 189 or a device receiving power in a wireless scheme depending on a scheme in which it receives the power.

The control unit 170 controls a general operation of the system 100. In detail, the control unit 170 may control all or some of the storing unit 110, the input unit 120, the output unit 130, the curve guide unit 140, the augmented reality providing unit 160, the communicating unit 180, the sensing unit 190, and the power supply unit 195.

In particular, the control unit 170 may acquire link information corresponding to a road on which a vehicle travels later. Here, the link information may acquire path guide data for path guidance to a destination.

For example, when destination information is input through the input unit 120, the control unit 170 may generate path guide data to a destination using map data previously stored in the storage unit 110. Alternatively, when the destination information is input through the input unit 120, the control unit 170 may transmit a path guiding request including at least one of current location information and destination information to the server. The path guide data may be received from the server according to a path guiding request. In this case, the control unit 170 may acquire link information corresponding to a road on which a vehicle travels from the path guide data.

In addition, the control unit 170 may acquire the link information based on traveling prediction path information of a vehicle based on real-time location information of the vehicle.

Meanwhile, the control unit 170 may provide path guiding information according to an embodiment of the present disclosure. That is, it is possible to detect a lane and guiding information in a lane display from the input top-view image, and provide path guiding information according to the detected traveling direction of the lane and the location of the current vehicle. In this case, the control unit 170 may use the above-described determination process of FIGS. 1 and 2.

The control unit 170 may control the output unit 130 to output lane change necessary information or transmit a control command to autonomous driving drive units (brake, accelerator, steering wheel, engine, electric motor, etc.) according to the determination result. In addition, the control unit 170 can output the lane guiding information according to a lane change time using a traveling path of the vehicle and information such as a curvature, a lane width, and the number of lanes as the traveling lane information.

If the necessity of the lane change is a first level, the control unit 170 may control the output unit 130 to output a first lane change guide. Here, the first level may be a numerical value indicating to the user that a lane change is preliminarily required.

In this case, the numerical value indicating the necessity of the lane change may be calculated in consideration of a distance between a branching point at which the traveling vehicle turns left or turns right and the current location, a speed of the vehicle, and the number of lanes.

If the necessity for the lane change is a second level, the control unit 170 may control the output unit 130 to output a second lane change guide. Here, the second level may be a numerical value indicating to a user a state in which a lane change is needed to a higher degree.

If the necessity for the lane change is lower than the first level, the control unit 170 may control the output unit 130 not to output the lane change guide.

In addition, the control unit 170 may divide the necessity of the lane change into three or more steps, and provide a user with a lane change guide suitable for a situation at each step.

In addition, the control unit 170 may control the output unit 130 not to output the lane change guide even when the necessity of the lane change exceeds the determined level by determining a condition that prioritizes the necessity of the lane change.

In addition, the control unit 170 may transmit provide the lane information and an update request message requesting the update of the guiding information in the lane to a server (not shown) providing the map data through the communication unit 180 when the lane information acquired from the top-view image and the guiding information in the lane differ from previously stored data during the path guidance or traveling. In this case, the update request message may also include the location information along with different lane information and guiding information in the lane.

In more detail, the priority condition may include a case where a vehicle exists in a changed lane, in a case where a re-search of a path occurs, or an event occurs in a traveling lane after a branch. In this case, the case may be preferentially considered.

Meanwhile, the lane change guide may be performed in an augmented reality screen. In detail, the augmented reality providing unit 160 may generate a lane change guide object and map the generated lane change guide object to a virtual 3D space to generate the augmented reality screen, and the control unit 170 may control the display unit 131 to display the generated augmented reality screen.

Figure 9:
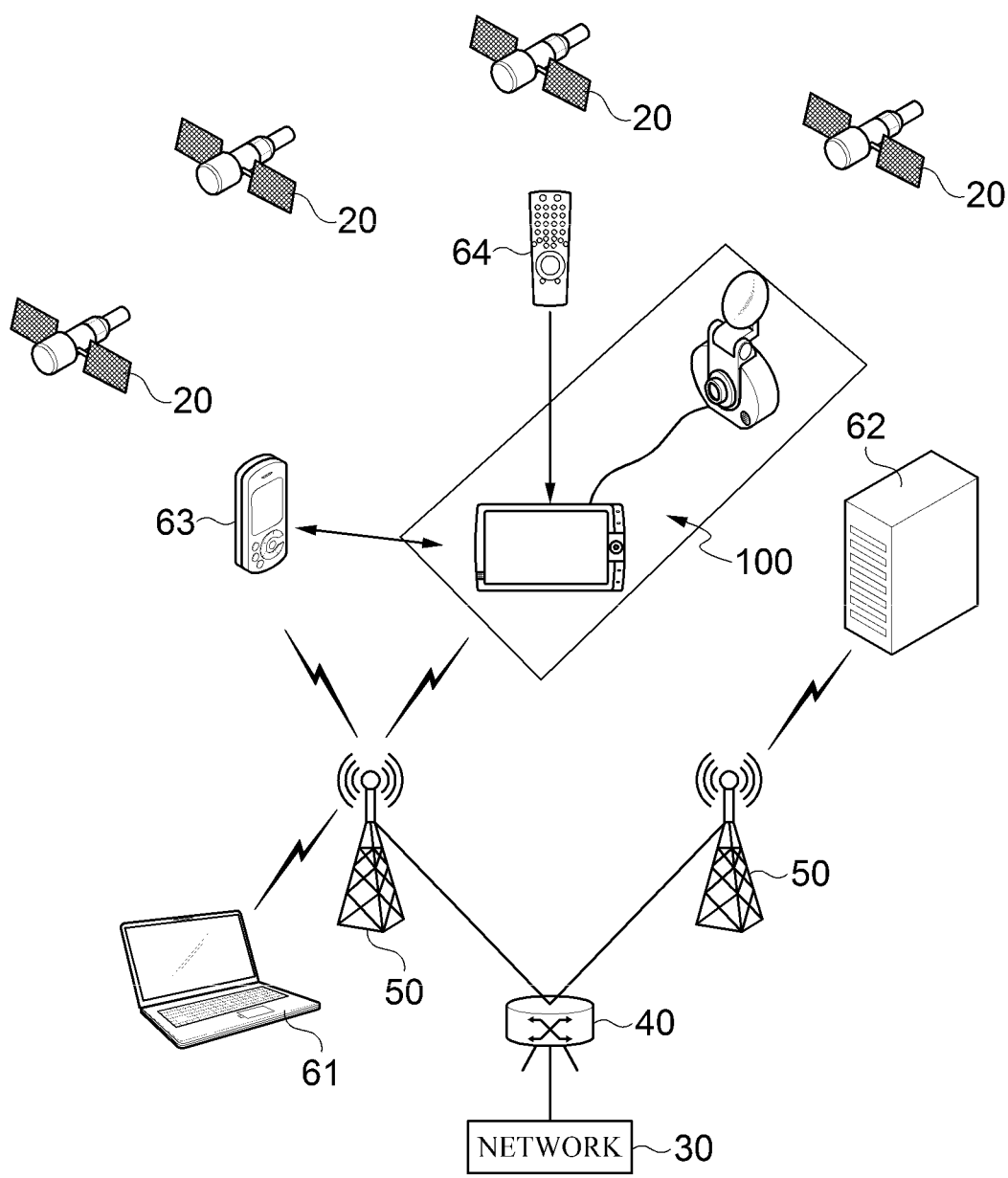
FIG. 9 is a diagram for describing a system network connected to the system according to the embodiment of the present disclosure.

FIG. 9 is a diagram for describing a system network connected to the system according to an embodiment of the present disclosure. Referring to FIG. 9, the system 100 according to the embodiment of the present disclosure may be implemented as various devices provided in the vehicle, such as a navigation, a video photographing device for a vehicle, a smart phone, other vehicle augmented reality interface providing apparatuses, or the like, and may be connected to various communication networks and other electronic devices 61 to 64.

In addition, the system 100 may interwork GPS modules with each other depending on radio signals received from artificial satellites 20 to calculate a current location and a current time.

The respective artificial satellites 20 may transmit L band frequencies of which frequency bands are different from each other. The system 100 may calculate the current location on the basis of a time required for the L band frequencies transmitted by the respective artificial satellites 20 to arrive at the system 100.

Meanwhile, the system 100 may wirelessly access a network 30 through an access control router (ACR) 40, a radio access station (RAS) 50, an access point (AP), and the like, via the communicating unit 180. When the system 100 accesses the network 30, the system 100 may be indirectly connected to other electronic devices 61 and 62 accessing the network 30 to exchange data.

Meanwhile, the system 100 may also indirectly access the network 30 through another device 63 having a communication function. For example, in the case in which a module that may access the network 30 is not included in the system 100, the system 100 may communicate with another device 63 having the communication function through a short range communication module, or the like.

Figure 10:
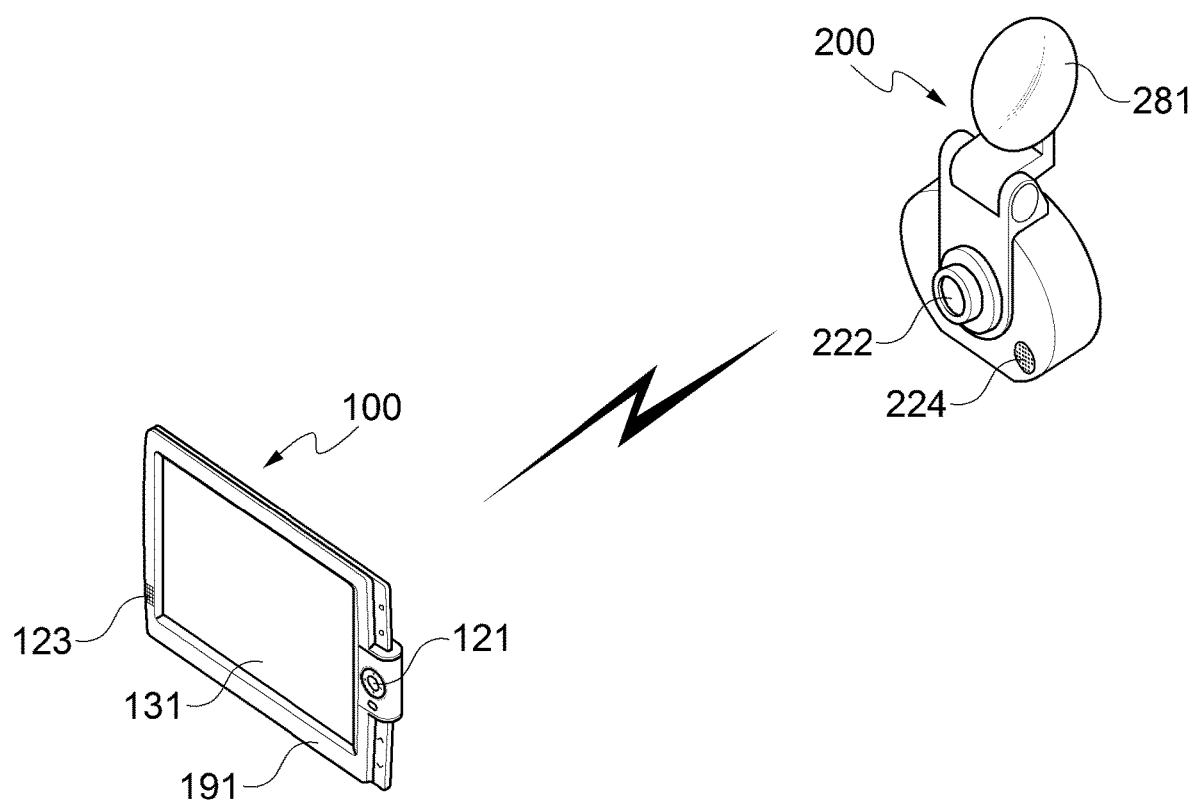
FIG. 10 is a diagram illustrating an implementation in a case where the system according to the embodiment of the present disclosure does not include a photographing unit.

FIG. 10 is a diagram illustrating an implementation form when the system according to the embodiment of the present disclosure does not include a photographing unit. Referring to FIG. 10, a system 100 for a vehicle and a separately provided video photographing device for a vehicle 200 may configure a system according to an embodiment of the present disclosure using a wired/wireless communication scheme.

The system 100 for a vehicle may include a display unit 131, a user input unit 121, and a navigation microphone 123 which are provided on a front surface of a navigation housing 191.

The video photographing device for a vehicle 200 may include a camera 222, a microphone 224, and an attaching part 281.

Figure 11:
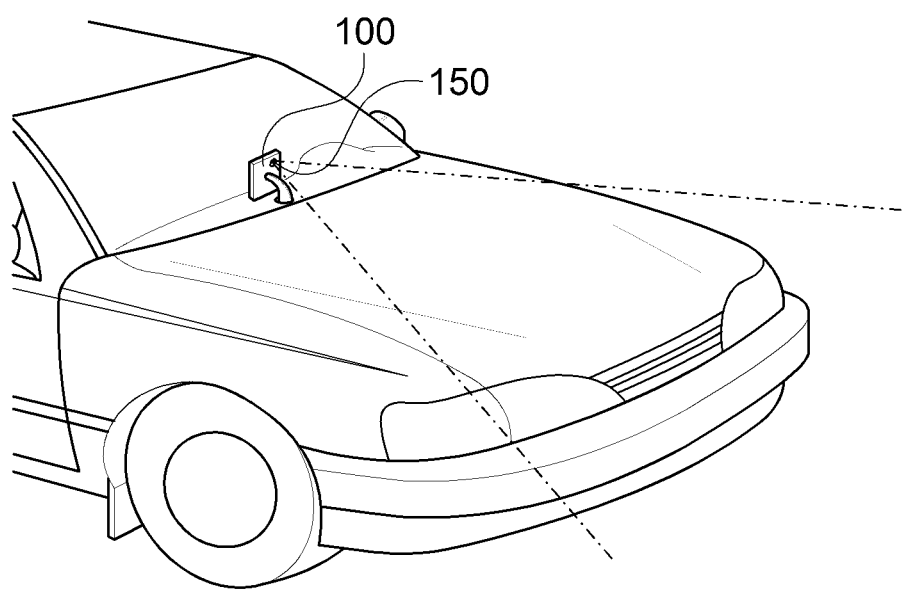
FIG. 11 is a diagram illustrating an implementation in a case where the system according to the embodiment of the present disclosure includes the photographing unit.
Figure 12:
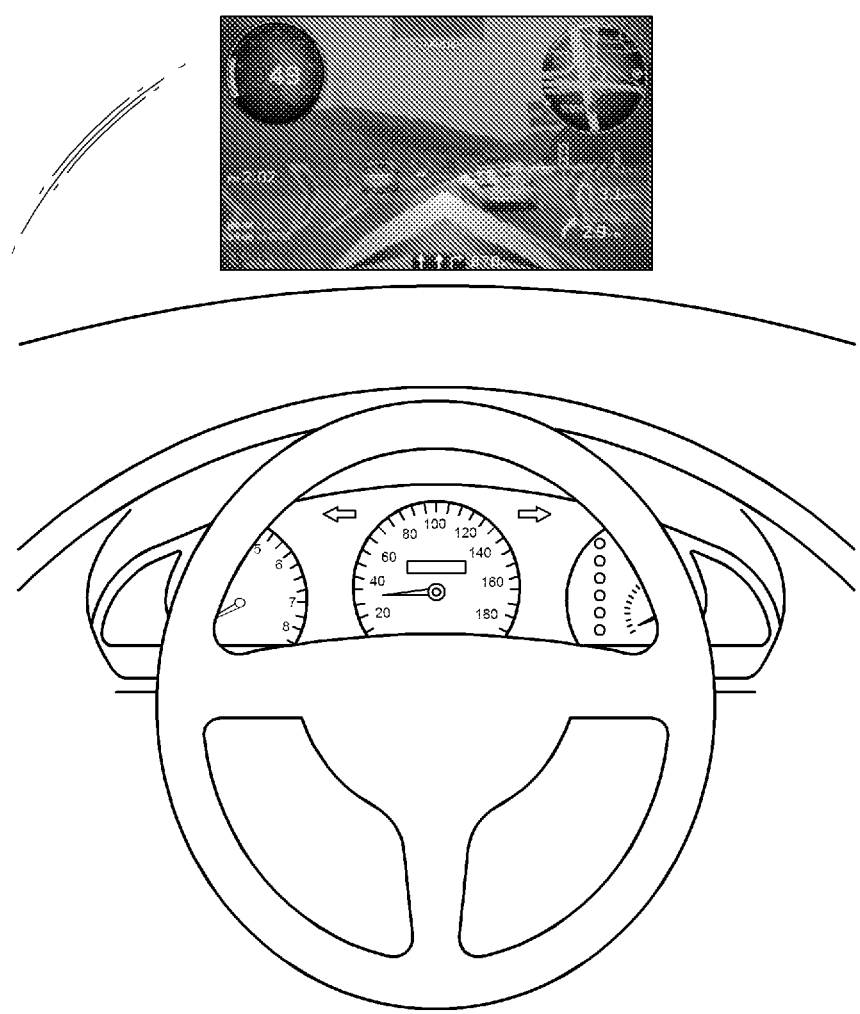
FIG. 12 is a diagram illustrating an implementation using a head-up display (HUD) according to an embodiment of the present disclosure.

FIG. 11 is a diagram illustrating an implementation form when the system according to the embodiment of the present disclosure does not include the photographing unit. Referring to FIG. 12, when the system 100 includes a photographing unit 150, the photographing unit 150 of the system 100 may be a device that may allow a user to photograph a front of a vehicle and recognize a display portion of the system 100. Therefore, the system according to the embodiment of the present disclosure may be implemented.

Figure 13:
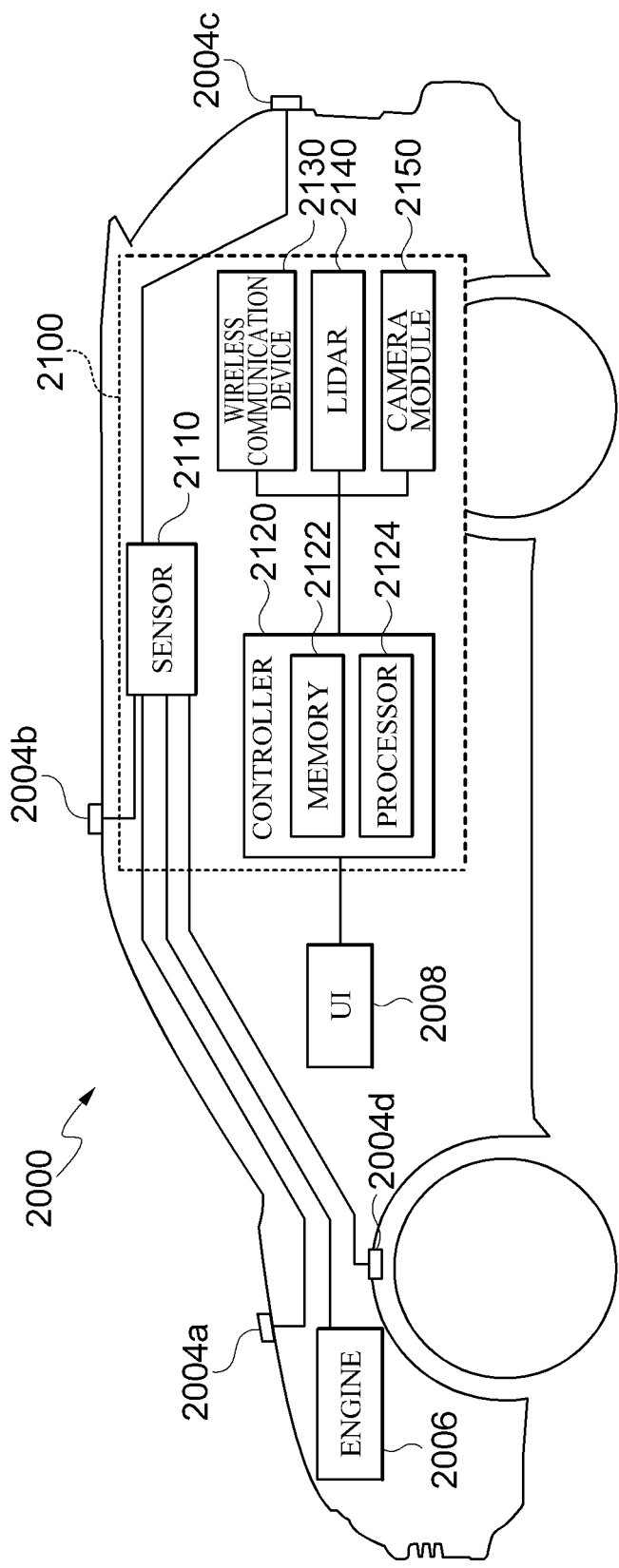
FIG. 13 is a block diagram illustrating a configuration of an autonomous driving vehicle according to an embodiment of the present disclosure.

FIG. 12 is a view illustrating an implementation using a head-up display (HUD) according to an embodiment of the present disclosure. Referring to FIG. 13, the HUD may display an augmented reality guidance screen thereon through wired/wireless communication with other devices.

As an example, the augmented reality may be provided through the HUD using a front glass of the vehicle, an image overlay using a separate image output apparatus, or the like, and the augmented reality providing unit 160 may generate an interface image overlaid on the augmented reality image or the glass as described above, or the like. Through this, an augmented reality navigation, a vehicle infortainment system, or the like, may be implemented.

Meanwhile, the method for guiding a path according to various embodiments of the present disclosure described above may be implemented as a program and provided to a server or devices. Therefore, the respective apparatuses may access the servers or the devices in which the programs are stored to download the programs.

In another embodiment, the method for guiding a path according to the present disclosure may be configured as a module in a control device 2100 of an autonomous driving vehicle 2000. That is, a memory 2122 and a processor 2124 of the control device 2100 may implement the method for guiding a path according to the present disclosure in software scheme.

Hereinafter, a detailed description will be given with reference to FIG. 13.

FIG. 13 is a block diagram illustrating a configuration of an autonomous driving vehicle 2000 according to an embodiment of the present disclosure.

Referring to FIG. 13, the autonomous driving vehicle 2000 according to the present embodiment may include a control device 2100, sensing modules 2004*a*, 2004*b*, 2004*c*, and 2004*d*, an engine 2006, and a user interface 2008.

In the present embodiment, the control device 2100 includes a controller 2120 including the memory 2122 and the processor 2124, a sensor 2110, a wireless communication device 2130, a LIDAR 2140, and a camera module 2150.

In the present embodiment, the controller 2120 may be configured at the time of manufacturing by the manufacturer of the vehicle or may be further configured to perform a function of autonomous driving after the manufacturing. Alternatively, a configuration for performing continuous additional functions may be included through an upgrade of the controller 2120 configured at the time of manufacturing.

The controller 2120 may transmit a control signal to the sensor 2110, the engine 2006, the user interface 2008, the wireless communication device 2130, the LIDAR 2140, and the camera module 2150 which are included as other components in the vehicle. In addition, although not shown, the control signal may also be transmitted to an acceleration device, a braking system, a steering device, or a navigation device related to the traveling of the vehicle.

In the present embodiment, the controller 2120 may control the engine 2006. For example, the autonomous driving vehicle 2000 detects a speed limit of a traveling road, and may control the engine 2006 so that a traveling speed does not exceed the speed limit or control the engine 2006 to accelerate the traveling speed of the autonomous driving vehicle 2000 within a range not exceeding the speed limit. In addition, if the sensing modules 2004*a*, 2004*b*, 2004*c*, and 2004*d* detect the environment outside the vehicle and transmits the detected environment to the sensor 2110, the controller 2120 receives the detected environment to generate a signal controlling the engine 2006 or the steering device (not shown), thereby controlling the traveling of the vehicle.

The controller 2120 may control the engine 2006 or the braking system to decelerate the traveling vehicle when other vehicles or obstacles exist in front of the vehicle, and control a trajectory, a traveling path, and a steering angle in addition to the speed. Alternatively, the controller 2120 may generate a necessary control signal according to recognition information of a traveling lane, a traveling signal, or other external environment of the vehicle to control the traveling of the vehicle.

In addition to generating its own control signal, the controller 2120 can control the traveling of the vehicle by performing communication with the surrounding vehicle or the central server and transmitting a command for controlling the peripheral apparatuses through the received information.

In the present embodiment, the controller 2120 may include the memory 2122 and the processor 2124. The processor 2124 may execute software stored in the memory 2122 according to the control signal of the controller 2120. Specifically, the controller 2120 stores data and instructions for performing the method for guiding a path according to the present disclosure in the memory 2122, and the instructions may be executed by the processor 2124 to implement one or more methods disclosed herein.

In this case, the memory 2122 may be stored in a recording medium executable by the nonvolatile processor 2124. The memory 2122 may store software and data through appropriate internal and external devices. The memory 2122 may include a random access memory (RAM), a read only memory (ROM), a hard disk, and a memory 2122 device connected to a dongle.

The memory 2122 may store at least an operating system (OS), a user application, and executable instructions. The memory 2122 may also store application data and array data structures.

The processor 2124 may be a controller, microcontroller, or state machine as a microprocessor or a suitable electronic processor.

The processor 2124 may be implemented in a combination of computing devices, and the computing device may be a digital signal processor, a microprocessor, or an appropriate combination thereof.

In addition, in the present embodiment, the control device 2100 may monitor the internal and external features of the autonomous driving vehicle 2000 and detect a state by using at least one sensor 2110.

The sensor 2110 may be configured as at least one sensing module 2004, and the sensing module 2004 may be implemented at a specific location of the autonomous driving vehicle 2000 according to a sensing purpose. The sensor may be located at the lower, rear, front, top, or side ends of the autonomous driving vehicle 2000, and may also be located at an internal part of a vehicle, a tire, or the like.

By this configuration, the sensing module 2004 may detect information related to traveling such as the engine 2006, a tire, a steering angle, a speed, and a weight of a vehicle as the internal information of the vehicle. In addition, at least one sensing module 2004 may be configured as an acceleration sensor, a gyroscope, an image sensor 2110, a RADAR, an ultrasonic sensor, a LiDAR sensor, and the like, and may detect movement information of the autonomous driving vehicle 2000.

The sensing module 2004 may receive, as external information, specific data on external environmental conditions such as state information of a road on which the autonomous driving vehicle 2000 is located, surrounding vehicle information, weather, and the like, and detect parameters of the vehicle accordingly. The detected information may be stored in the memory 2122 depending on the purpose, either temporarily or in the long term.

In the present embodiment, the sensor 2110 may integrate and collect information of the sensing modules 2004 for collecting information generated from the inside and outside the autonomous driving vehicle 2000.

The control device 2100 may further include the wireless communication device 2130.

The wireless communication device 2130 is configured to implement wireless communication between the autonomous driving vehicles 2000. For example, the autonomous driving vehicle 2000 may communicate with a user's mobile phone or other wireless communication device 2130, another vehicle, a central device (traffic control device), a server, and the like. The wireless communication device 2130 may transmit and receive a wireless signal according to an access wireless protocol. The wireless communication protocol may be Wi-Fi, Bluetooth, long-term evolution (LTE), code division multiple access (CDMA), wideband code division multiple access (WCDMA), global systems for mobile communications (GSM), and the communication protocols are not limited thereto.

In addition, in the present embodiment, the autonomous driving vehicle 2000 may implement inter-vehicle communication through the wireless communication device 2130. That is, the wireless communication device 2130 may communicate with other vehicles on the road through vehicle-to-vehicle communication (V2V). The autonomous driving vehicle 2000 may transmit and receive information such as driving warnings and traffic information through vehicle-to-vehicle communication, and may request information to other vehicles and receive the request. For example, the wireless communication device 2130 may perform V2V communication as a dedicated short-range communication (DSRC) device or a cellular-V2V (C-V2V) device. In addition to the inter-vehicle communication, vehicle to everything communication (V2X) between the vehicle and other objects (for example, an electronic device carried by a pedestrian) may be implemented through the wireless communication device 2130.

In addition, the control device 2100 may include the LIDAR device 2140. The LIDAR device 2140 may detect an object around the autonomous driving vehicle 2000 during the operation using data sensed by the LIDAR sensor. The LIDAR device 2140 may transmit the detected information to the controller 2120, and the controller 2120 may operate the autonomous driving vehicle 2000 according to the detected information. For example, the controller 2120 may instruct the vehicle to reduce a speed through the engine 2006 when there is a front vehicle traveling at a low speed in the detected information. Alternatively, the controller 2120 may instruct the vehicle to reduce the entry speed according to a curvature of a curve in which the vehicle enters.

The control device 2100 may further include the camera module 2150. The controller 2120 may extract object information from the external image photographed by the camera module 2150 and process information on the object information.

In addition, the control device 2100 may further include imaging devices for recognizing the external environment. In addition to the LIDAR 2140, a RADAR, a GPS device, an odometry, and other computer vision devices may be used, and these devices may be selected or simultaneously operated as needed to enable more precise detection.

The autonomous driving vehicle 2000 may further include the user interface 2008 for a user input to the control device 2100 described above. The user interface 2008 may allow a user to input information with appropriate interactions. For example, it may be implemented as a touch screen, a keypad, an operation button, or the like. The user interface 2008 may transmit an input or an instruction to the controller 2120, and the controller 2120 may perform a control operation of the vehicle in response to the input or the command.

In addition, the user interface 2008 may be a device outside the autonomous driving vehicle 2000 and may communicate with the autonomous driving vehicle 2000 through the wireless communication device 2130. For example, the user interface 2008 may be interwork with a mobile phone, a tablet, or other computer devices.

Furthermore, the autonomous driving vehicle 2000 has been described as including the engine 2006 in the present embodiment, but may include other types of propulsion systems. For example, the vehicle may be driven by electrical energy and may be operated by hydrogen energy or a hybrid system combining them. Accordingly, the controller 2120 may include a propulsion mechanism according to a propulsion system of the autonomous driving vehicle 2000, and thus may provide the control signal to components of each propulsion mechanism.

Figure 14:
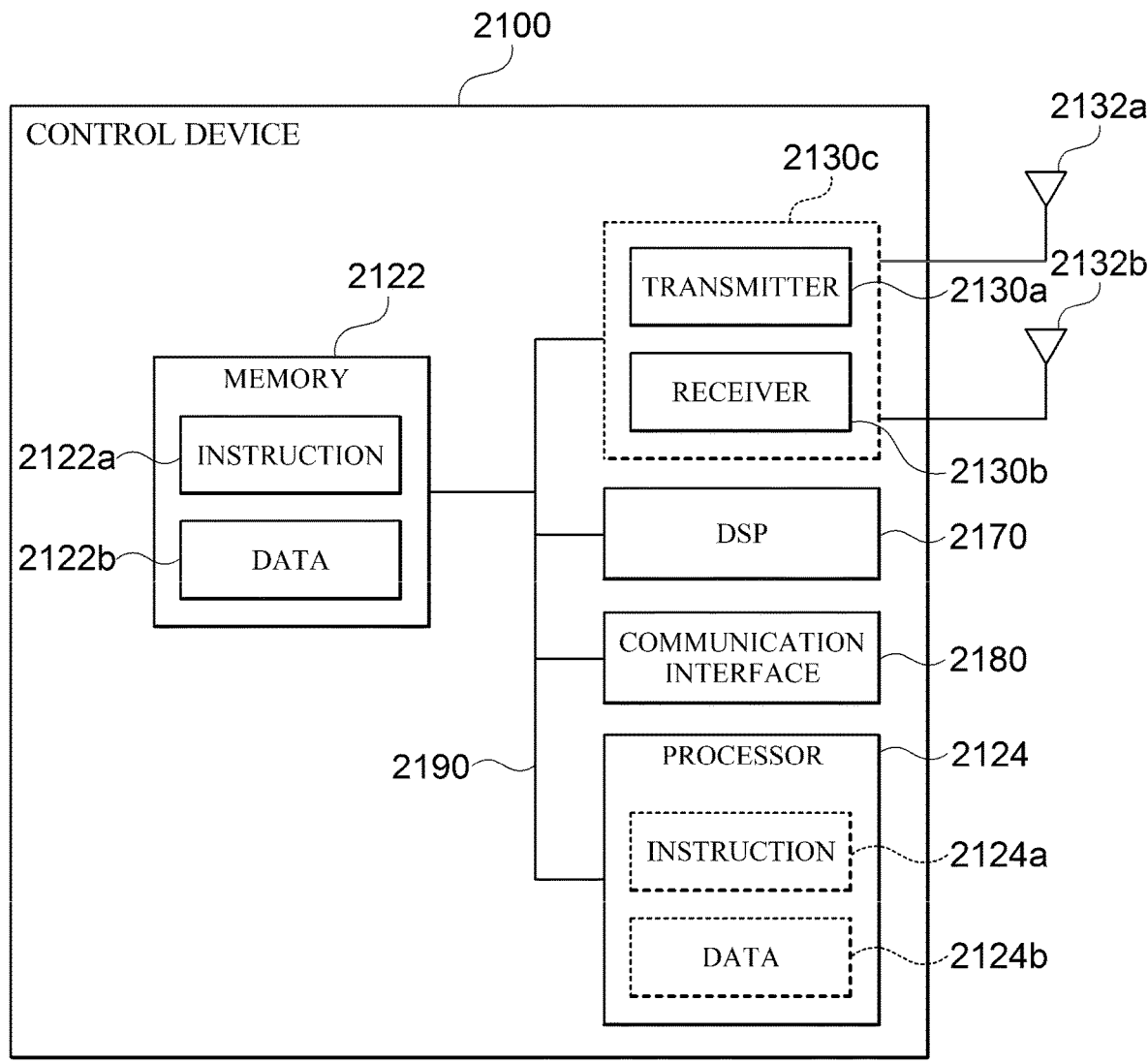
FIG. 14 is a block diagram illustrating a detailed configuration of a control device according to an embodiment of the present disclosure.

Hereinafter, a detailed configuration of the control device 2100 for performing the method for guiding a path according to the present disclosure according to the present embodiment will be described in detail with reference to FIG. 14.

The control device 2100 includes the processor 2124. The processor 2124 may be a general purpose single or multi-chip microprocessor, a dedicated microprocessor, a microcontroller, a programmable gate array, or the like. The processor may be referred to as a central processing unit (CPU). In addition, in the present embodiment, the processor 2124 may be used as a combination of a plurality of processors.

The control device 2100 also includes the memory 2122. The memory 2122 may be any electronic component capable of storing electronic information. The memory 2122 may be a combination of memories 2122 in addition to a single memory.

Data 2122b and instructions 2122a for performing the method for guiding a path according to the present disclosure may be stored in the memory 2122. When the processor 2124 executes the instructions 2122a, all or some of the instructions 2122a and the data 2122b required for the execution of the instructions may be loaded (2124a and 2124b) onto the processor 2124.

The control device 2100 may include a transmitter 2130a, a receiver 2130b, or a transceiver 2130c to allow transmission and reception of signals. One or more antennas 2132a and 2132b may be electrically connected to the transmitter 2130a, the receiver 2130b, or each of the transceivers 2130c and may further include antennas.

The control device 2100 may include a digital signal processor (DSP) 2170. The DSP 2170 enables a vehicle to process digital signals quickly.

The control device 2100 may include a communication interface 2180. The communication interface 2180 may include one or more ports and/or communication modules for connecting other devices to the control device 2100. The communication interface 2180 may enable the user and the control device 2100 to interact.

Various configurations of the control device 2100 may be connected together by one or more buses 2190, and the buses 2190 may include a power bus, a control signal bus, a status signal bus, a data bus, and the like. Under the control of the processor 2124, the components may transmit information to each other through the bus 2190 and perform a desired function.

The devices described hereinabove may be implemented by hardware components, software components, and/or combinations of hardware components and software components. The devices and the components described in the embodiments may be implemented using one or more general purpose computers or special purpose computers such as a processor, a controller, an arithmetic logic unit (AUL), a digital signal processor, a microcomputer, a field programmable gate array (FPGA), a programmable logic unit (PLU), a microprocessor, or any other devices that may execute instructions and respond to the instructions.

A processing device may execute an operating system (OS) and one or more software applications executed on the operating system. In addition, the processing device may access, store, manipulate, process, and generate data in response to execution of software. Although a case in which one processing device is used is described for convenience of understanding, it may be recognized by those skilled in the art that the process device may include a plurality of processing elements and/or plural types of processing elements. For example, the processing device may include a plurality of processors or one processor and one controller. In addition, other processing configurations such as parallel processors are also possible.

The software may include computer programs, codes, instructions, or a combination of one or more thereof, and may configure the processing device to be operated as desired or independently or collectively command the processing device to be operated as desired. The software and/or the data may be permanently or temporarily embodied in any type of machine, component, physical device, virtual equipment, computer storage medium or device, or transmitted signal wave to be interpreted by the processing device or provide instructions or data to the processing device. The software may be distributed on computer systems connected to each other by a network to be thus stored or executed by a distributed method. The software and the data may be stored in one or more computer-readable recording media.

The methods according to the embodiment may be implemented in a form of program commands that may be executed through various computer means and may be recorded in a computer-readable recording medium. The computer-readable recording medium may include a program command, a data file, a data structure or the like, alone or a combination thereof. The program commands recorded in the computer-readable recording medium may be especially designed and configured for the embodiments or be known to those skilled in a art of computer software. Examples of the computer-readable recording medium may include a magnetic medium such as a hard disk, a floppy disk, or a magnetic tape; an optical recording medium such as a compact disk read only memory (CD-ROM) or a digital versatile disk (DVD); a magneto-optical medium such as a floptical disk; and a hardware device specially configured to store and perform program commands, such as a ROM, a random access memory (RAM), a flash memory, or the like. Examples of the program commands include a high-level language code capable of being executed by a computer using an interpreter, or the like, as well as a machine language code made by a compiler. The abovementioned hardware device may be constituted to be operated as one or more software modules to perform the operations of the embodiments, and vice versa.

The spirit of the present disclosure has been illustratively described hereinabove. It will be appreciated by a person of ordinary skill in the art that various modifications and alterations may be made without departing from the essential characteristics of the present disclosure.

Accordingly, the embodiments disclosed in the present disclosure and the accompanying drawings are not intended to limit the technical spirit of the present disclosure but to explain, and the scope of the technical spirit of the present disclosure is not limited by the embodiments and the accompanying drawings. The scope of the present disclosure should be interpreted by the following claims and it should be interpreted that all spirits equivalent to the following claims fall within the scope of the present disclosure.

What is claimed is:

1. A method for guiding a path, comprising:
acquiring an image;
converting the acquired image into a top-view image;
extracting a lane from a lane display line in the converted top-view image;
searching a candidate area in the extracted lane using a mask;
extracting a guiding information by comparing changes in a distribution of feature values of an arrow head portion within the candidate area relative to an x-axis or a y-axis; and
guiding a path of a vehicle using the extracted lane and the guiding information in the lane.

2. The method of claim 1, wherein the guiding information in the lane is information for guiding a possible traveling direction of the vehicle in the lane, and
in the extracting the guiding information, the information for guiding the possible traveling direction is determined by comparing with a histogram which defines the distribution of the feature values according to locations of pixels in the image.

3. The method of claim 2, wherein in the extracting the guiding information, the distribution of the feature values is extracted by searching for pixels in the top-view image based on the x-axis or the y-axis.

4. The method of claim 3, wherein in the extracting the guiding information, a search criterion of a pixel for determining the distribution of the feature values is determined according to a continuous direction of the mask.

5. The method of claim 4, wherein the mask is formed in rectangles continued in a horizontal direction based on the image, and includes a first mask that recognizes an upward possible traveling direction and a second mask that recognizes a downward possible traveling direction.

6. The method of claim 4, wherein the mask is formed in rectangles continued in a vertical direction based on the image, and includes a third mask that recognizes a leftward possible traveling direction and a fourth mask that recognizes a rightward possible traveling direction.

7. The method of claim 2, wherein in the extracting of the guiding information, template matching or a support vector machine (SVM) is further used to recognize the possible traveling direction of the lane.

8. The method of claim 2, wherein in the extracting the guiding information, whether a tail portion in a shape of an arrow includes additional information to recognize the possible traveling direction or an impossible traveling direction is further determined.

9. The method of claim 1, wherein in the guiding the path of the vehicle, the path of the vehicle and the guiding information in the lane are compared to guide whether a change to another lane is necessary.

10. The method of claim 8, wherein in the guiding the path of the vehicle, whether a vehicle exists in the lane to guide whether a change to another lane is necessary is further determined.

11. An electronic device, comprising:
an image acquisition unit configured to acquire an image;
an image conversion unit configured to convert the acquired image into a top-view image;
a lane extraction unit configured to extract a lane from a lane display line in the converted top-view image;

a guiding information extraction unit configured to extracting a guiding information by comparing changes in a distribution of feature values of an arrow head portion within a candidate area in the extracted lane using a mask relative to an x-axis and a y-axis; and a path guide unit configured to guide a path of a vehicle using the extracted lane and the guiding information in the lane.

12. The electronic device of claim 11, wherein the guiding information extraction unit recognizes a possible traveling direction of the vehicle in the lane, and in the guiding information extraction unit, information for guiding the possible traveling direction is determined by comparing with a histogram which defines the distribution of the feature values according to locations of pixels in the image.

13. The electronic device of claim 12, wherein in the guiding information extraction unit, the distribution of the feature values is extracted by searching for pixels in the top-view image based on the x-axis or the y-axis.

14. The electronic device of claim 13, wherein in the guiding information extraction unit, a search criterion of a pixel for determining the distribution of the feature values is determined according to a continuous direction of the mask.

15. The electronic device of claim 14, wherein the mask is formed in rectangles continued in a vertical direction based on the image, and includes a third mask that recognizes a leftward possible traveling direction and a fourth mask that recognizes a rightward possible traveling direction.

16. The electronic device of claim 14, wherein the guiding information extraction unit further uses template matching or a support vector machine (SVM) to recognize the possible traveling direction of the lane.

17. The electronic device of claim 12, wherein the guiding information extraction unit further determines whether a tail portion in a shape of an arrow includes additional information to recognize the possible traveling direction or an impossible traveling direction.

18. The electronic device of claim 12, wherein the path guide unit determines whether a vehicle exists in the lane to guide whether a change to another lane is necessary.

19. A program stored in a non-transitory computer-readable recording medium to perform the method for guiding a path according to the method of claim 1.

20. A non-transitory computer-readable recording medium storing a program for performing the method for guiding a path according to the method of claim 1.

* * * * *